US011869470B2

(12) United States Patent
Hakuta et al.

(10) Patent No.: US 11,869,470 B2
(45) Date of Patent: Jan. 9, 2024

(54) ACOUSTIC SYSTEM

(71) Applicant: FUJIFILM Corporation, Tokyo (JP)

(72) Inventors: Shinya Hakuta, Ashigara-kami-gun (JP); Yoshihiro Sugawara, Ashigara-kami-gun (JP); Akihiko Ohtsu, Ashigara-kami-gun (JP); Shogo Yamazoe, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 400 days.

(21) Appl. No.: 17/232,835

(22) Filed: Apr. 16, 2021

(65) Prior Publication Data

US 2021/0233505 A1 Jul. 29, 2021

Related U.S. Application Data

(63) Continuation of application No. PCT/JP2019/038953, filed on Oct. 2, 2019.

(30) Foreign Application Priority Data

Oct. 19, 2018 (JP) ................................ 2018-197722

(51) Int. Cl.
*G10K 11/172* (2006.01)
*F24F 13/24* (2006.01)
*G10K 11/16* (2006.01)

(52) U.S. Cl.
CPC ............ *G10K 11/161* (2013.01); *F24F 13/24* (2013.01); *G10K 11/172* (2013.01)

(58) Field of Classification Search
CPC .... G10K 11/172; G10K 11/16; G10K 11/161; F24F 13/02; F24F 13/24; F24F 2013/245;
(Continued)

(56) References Cited

U.S. PATENT DOCUMENTS 2,541,159 A * 2/1951 Geiger ...................... E04B 1/84 181/208
7,891,464 B2 * 2/2011 Tang ..................... F04D 29/663 181/224

(Continued)

FOREIGN PATENT DOCUMENTS

GB 2546792 A 8/2017
JP 2001-248418 A 9/2001

(Continued)

OTHER PUBLICATIONS

Extended European Search Report for corresponding European Application No. 19873640.7, dated Mar. 7, 2022.

(Continued)

*Primary Examiner* — Edgardo San Martin
(74) *Attorney, Agent, or Firm* — Birch, Stewart, Kolasch & Birch, LLP

(57) ABSTRACT

An acoustic system includes a duct that has a function of causing a fluid to flow therein and has a tubular shape, an internal sound source that is disposed inside the duct on an upstream side or at an outer peripheral portion of the duct, which communicates with an inside of the duct on the upstream side, or an external sound source that is on an outside from an end portion of the duct, and a membrane-shaped member that is formed as a part of a wall of the duct and vibrates in response to sound. A structure including the membrane-shaped member and a rear surface closed space thereof causes acoustic resonance to occur, transmits the acoustic resonance from the sound source into the duct, and suppresses sound radiated from the other end portion of the duct on a downstream side. The external sound source is at a distance within a wavelength at a frequency of the acoustic resonance on the outside from the end portion of the duct. In the acoustic system, as a small membrane-type resonance structure is disposed in a flow passage horizontal direction,
(Continued)

wind does not directly hit a membrane surface perpendicularly, and since the acoustic system does not have a through hole or a hole, wind noise can be eliminated.

23 Claims, 24 Drawing Sheets

(58) Field of Classification Search
CPC . F02M 35/12; F02M 35/1255; F02M 35/1272
See application file for complete search history.

(56) References Cited

U.S. PATENT DOCUMENTS 7,942,234 B2 * 5/2011 Utsunomiya .......... G03B 21/16 381/71.5
8,337,145 B2 * 12/2012 Frater .................... F04D 29/663 128/200.24
8,360,201 B2 * 1/2013 Tanase ................. G10K 11/172 181/291
9,711,129 B2 * 7/2017 Sheng .................. G10K 11/162
10,971,129 B2 * 4/2021 Yamazoe ................ E04B 1/994
11,021,870 B1 * 6/2021 McKnight ................. E04B 1/84
11,536,411 B2 * 12/2022 Hakuta ............... F16L 55/0336
11,551,656 B2 * 1/2023 Hakuta ................ G10K 11/172
11,654,841 B2 * 5/2023 Hakuta ............... B60R 13/0884 181/202
2005/0096882 A1 5/2005 Huang et al.
2005/0161280 A1 * 7/2005 Furuya .................... F01N 1/023 181/224
2005/0194209 A1 9/2005 Yang et al.
2007/0163533 A1 * 7/2007 Nakayama ......... F02M 35/1283 123/184.57
2008/0053749 A1 3/2008 Utsunomiya
2009/0223738 A1 * 9/2009 Nakamura ........... G10K 11/172 181/175
2010/0212999 A1 * 8/2010 Marion ................ G10K 11/172 181/250
2011/0240402 A1 * 10/2011 Chou ...................... F16F 15/04 181/207
2022/0010813 A1 * 1/2022 Sugawara ............ G10K 11/172
2022/0018363 A1 * 1/2022 Hakuta ................ G10K 11/172
2022/0389939 A1 * 12/2022 Hakuta ................. F04D 29/665

FOREIGN PATENT DOCUMENTS

JP 2003-83186 A 3/2003
JP 2004-293365 A 10/2004
JP 2007-321738 A 12/2007
JP 2008025472 A * 2/2008 ......... F02M 35/1244
JP 2008025473 A * 2/2008 ......... F02M 35/1222
JP 4215790 B2 1/2009
JP 2010026257 A * 2/2010
JP 5499460 B2 5/2014
WO WO 2018/150828 A1 8/2018

OTHER PUBLICATIONS

Huang et al., "Suppression of broadband noise radiated by a low-speed fan in a duct," The Journal of the Acoustical Society of America, vol. 128, No. 1, Jul. 2010, pp. 152-163, 12 pages total.
International Preliminary Report on Patentability and Written Opinion of the International Searching Authority (Forms PCT/IB/326, PCT/IB/373 and PCT/ISA/237) for corresponding International Application No. PCT/JP2019/038953, dated Apr. 29, 2021, with English translation.
International Search Report (Form PCT/ISA/210) for corresponding International Application No. PCT/JP2019/038953, dated Dec. 17, 2019, with English translation.

* cited by examiner

ACOUSTIC SYSTEM

CROSS-REFERENCE TO RELATED APPLICATIONS

This application is a Continuation of PCT International Application No. PCT/JP2019/038953 filed on Oct. 2, 2019, which claims priority under 35 U.S.C. § 119(a) to Japanese Patent Application No. 2018-197722 filed on Oct. 19, 2018. Each of the above applications is hereby expressly incorporated by reference, in its entirety, into the present application.

BACKGROUND OF THE INVENTION

1. Field of the Invention

The present invention relates to an acoustic system that includes a structure which causes a fluid including wind and/or heat to flow, such as a blower including a fan, and a duct attached thereto. The present invention particularly relates to an acoustic system that effectively muffles specific frequency noise generated by the fan in the duct.

2. Description of the Related Art

In the related art, in buildings, residents, and the like, a ventilation duct, such as an air conditioning duct to which a fan is attached, has been widely used for indoor air conditioning, ventilation, and/or air blowing, but noise reduction and miniaturization are strongly desired due to demand for indoor comfort, quietness, and the like.

Specifically, noise predominant at a specific frequency determined by the number of blades and a rotation speed of the fan has become a major problem of fan noise.

Although a normal porous sound absorber can also be used in the duct, the porous sound absorber only lowers sound as a whole, and it is difficult to change a relative relationship in which the noise is loud only at the specific frequency. It is known that the predominant specific frequency sound is easy to be heard in the field of psychoacoustics, and a method of significantly lowering only specific sound is required, which is difficult for the normal porous sound absorber.

In addition, in a case where the porous sound absorber is configured by a fiber-based sound absorber or a deteriorating material, the fibers or peeled pieces are carried by the wind of the fan and fly as dust, having an effect on a device, or being discharged to the environment, which is not preferable.

In addition, demand for the miniaturization and weight reduction of the device is high, and muffling with a lower weight and a smaller size to the extent possible is required. In particular, since the length of the duct is extremely small in many cases, size reduction in a duct flow passage direction is also required for a muffling structure.

For example, JP4215790B discloses a muffling device that effectively suppresses noise of a cooling fan used in a device having the cooling fan and a cooling duct, for example, a projection-type display device, such as a liquid crystal projector device.

The muffling device disclosed in JP4215790B has, in the cooling duct, a resonance-type muffler configured by a reflecting plate that is formed, at a position facing an intake surface of the cooling fan, substantially parallel to the intake surface and reflects sound from the cooling fan, an air chamber that is provided on an opposite side to the cooling fan with the reflecting plate interposed therebetween, and a through hole that is provided in the reflecting plate and communicates with the air chamber. In the muffling device, the intake surface of the cooling fan and a flow passage direction of the cooling duct are at a right angle, and the intake surface of the cooling fan and the reflecting plate of the resonance-type muffler, for example, a sound absorption surface of a Helmholtz resonator, a plate surface of a plate-shaped sound absorber, or a membrane surface of a membrane-shaped sound absorber face each other. In the muffling device, since the fan and the duct are at a right angle, only a frequency, which is equal to or higher than a cutoff frequency of the duct and at which a higher-order mode of sound can be generated, is emitted from the fan and flows in a direction of the duct. That is, as the diameter of the duct decreases, the cutoff frequency determined by the diameter of the duct increases, and sound at the frequency or less does not become traveling waves in the flow passage direction of the duct, is confined between the fan and a facing resonance surface, and is absorbed. The muffling device disclosed in JP4215790B can provide a silent duct that is small in size, is low-cost, and has a high a muffling effect.

JP5499460B discloses a duct that is provided in a vehicle and causes air to be sent from an air conditioning device to a vehicle interior to flow therein, the duct being capable of absorbing sound at a relatively low frequency, such as engine sound and road noise.

The duct disclosed in JP5499460B is connected to a plurality of sound absorbing structures each comprising a housing that has an open hollow region, first and second holes that are provided in the housing, and a membrane-shaped or plate-shaped vibrating body that closes an opening portion of the hollow region, so that the hollow regions communicate with each other via the first and second holes. The sound absorption of the duct corresponds to a mechanism that has a hole provided in a space of the hollow region between the housing and a membrane surface and absorbs sound causing resonance with a membrane by adjusting the length of the membrane surface in a width (horizontal) direction to $\lambda/4$.

In the duct disclosed in JP5499460B, each sound absorbing structure having a simple configuration performs sound absorption by converting sound waves into vibration and consuming sound wave energy as mechanical energy. In addition, the sound absorbing structure is suitable for absorbing, for example, low-frequency sound that comes from an engine room and the like and infiltrates into the vehicle interior or comes from the air conditioning device and infiltrates into the vehicle interior.

SUMMARY OF THE INVENTION

However, muffling of noise having a specific frequency described above with the use of a resonance structure can be examined. As the resonance structure, for example, a Helmholtz resonance structure disclosed in JP4215790B or an air column resonance structure can be examined, but the characteristic of the structures is that the structures have an opening portion. In a case where the resonating bodies are disposed in a system that causes wind to flow, such as a fan, there is a problem that wind noise is generated in the opening portion. For example, the air column resonance structure is a structure that causes cavity noise in aerodynamic noise, generating new noise. In addition, a Helmholtz resonating body also has a structure where wind noise generated at the opening portion strongly generates specific sound due to an effect of the resonating body so that in a case where air is blown into the mouth of a PET bottle, the bottle is rung with specific sound. Due to these, the resonance structure having the opening portion is difficult to be applied to the system that causes wind to flow, such as the fan.

For this reason, the present inventor has examined muffling of specific frequency sound caused by blades of the fan with the use of a membrane-type resonance structure as disclosed in JP4215790B. Since the membrane-type resonance structure does not need an opening portion, the membrane-type resonance structure does not become a generation source of new wind noise in response to wind, unlike the Helmholtz resonance structure and the air column resonance structure. In this state, fan specific noise can be muffled by a resonance phenomenon.

However, in the muffling device disclosed in JP4215790B, even in a case where the membrane-shaped sound absorber is provided to face the intake surface of the fan, the cooling duct is an intake duct, and noise on an intake side of the fan can be muffled, there is a problem that noise transmitted from the fan to a downstream side of the duct along with an air flow, such as wind, cannot be muffled.

Even in a case where the membrane-shaped sound absorber of the muffling device disclosed in JP4215790B is disposed on the downstream side of the fan, the wind of the fan hits perpendicularly to the resonating body due to the configuration, and the tension of the membrane changes as a high wind pressure is applied to the membrane surface. Thus, there is a problem that the membrane practically becomes hard and the membrane is regarded as not actually functioning as a membrane vibration sound absorbing structure. Further, in this case, since a fan wind direction and a duct direction are disposed perpendicularly to each other, there is a problem that it is necessary to further increase fan air volume to cause high wind to flow, and accordingly a wind pressure applied to the membrane increases.

In addition, there is a problem that also wind noise attributable to the through hole described in JP4215790B is extremely close to the fan.

In addition, the muffling device disclosed in JP4215790B has a problem of not being able to be applied to a system that causes the flow of high air volume since the diameter of the duct needs to be decreased.

In the sound absorbing structures of the duct disclosed in JP5499460B, a rear surface of the membrane is opened and does not comprise a rear surface closed space for resonance, so that there is a problem that a large muffling effect cannot be obtained.

In addition, in the sound absorbing structures, the vibrating body such as the membrane vibrates due to a sound pressure difference between the hollow region and the vehicle interior, the sound pressure of sound in a predetermined frequency band, which is generated in the vehicle interior, is reduced, and the predetermined frequency band is set based on the resonant frequency of a spring mass system configured by a mass component of the vibrating body and a spring component of the hollow region. For this reason, there is a problem that the size of the membrane needs to be increased. In JP5499460B, since a frequency at which the sound pressure of wind exhaust sound of the blower is particularly high is determined by the specifications of the air conditioning device and the like, the wavelength of sound generated by the driving of the blower included in the air conditioning device is determined, and a length W of the membrane in the width direction corresponding thereto may be set. Since sound at a relatively low frequency including rotating sound of the blower, such as the fan, has a particularly high sound pressure at 500 Hz, the length of the membrane in the width direction is set to 160 mm, which is a length ¼ of the wavelength of this sound. For example, since the wavelength of sound at 2 kHz is approximately 170 mm, it is necessary to set the size of the membrane to approximately 43 mm in order to muffle the sound at 2 kHz. As described above, since the size of wavelength/4 is necessary even in a case where the membrane is used, miniaturization is difficult.

In addition, a configuration where wind flows from a small hole in a side wall is adopted. There is also a problem that as the wind passes through the hole, wind noise is generated, $\lambda/4$ resonance occurs in response to the wind noise, and wind noise at a specific frequency is amplified.

In addition, a configuration where small hole portions are formed at intervals in a duct flow passage is adopted since the length of $\lambda/4$ is used. Thus, it is difficult to increase air volume and a vortex is also generated at a portion where a duct diameter changes sharply. Thus, the configuration is a structure which is not suitable for causing higher air volume to flow. In addition, there is also a problem that the duct becomes large even in a case of having low air volume.

In addition, since JP5499460B only discloses a configuration where the sound absorbing structures are disposed in a far-field of the fan and uses a membrane structure having a length in the width direction of $\lambda/4$, there is also a problem that it is difficult to obtain a position optimizing effect even in a case of being disposed nearby the fan.

An object of the present invention is to provide an acoustic system in which wind does not directly hit a membrane surface perpendicularly by eliminating the problems of the related art and disposing a small membrane-type resonance structure in a flow passage horizontal direction and wind noise can be eliminated since there is no through hole or no hole.

In order to achieve the object, the present inventor has examined that muffling of specific frequency sound caused by blades of a fan with the use of the membrane-type resonance structure, and has discovered the following points.

Since the membrane-type resonance structure does not need an opening portion, the membrane-type resonance structure does not become a generation source of new wind noise in response to wind. In this state, fan specific noise can be muffled by a resonance phenomenon. These are advantages of the membrane-type resonance structure in a case of being compared to other resonance structures.

Further, by matching the membrane surface with another duct surface, it is possible to obtain a muffling structure without unevenness on a duct wall. Since the unevenness on the wall is a generation source of aerodynamic noise caused by wind, it is desirable not to have the unevenness.

In addition, it is also a problem that a wind pressure has an effect on a sound absorbing material in a case where wind flows inside the duct. However, by creating the membrane surface on the duct wall, a direction in which wind flows and a vertical direction of the membrane are almost in a relationship of forming a right angle. Thus, the effect of the wind pressure is barely received, and the sound absorbing material functions even in a case where air volume changes.

As described above, by applying the membrane-type resonance structure to the fan duct, various problems can be solved and muffling can be performed for specific frequency noise of the fan.

According to a first aspect of the present invention, there is provided an acoustic system including a duct that has a function of causing a fluid to flow therein and has a tubular shape, an internal sound source that is disposed inside the duct on an upstream side or at an outer peripheral portion of the duct, which communicates with an inside of the duct on the upstream side, or an external sound source that is on an outside from an end portion of the duct, and a membrane-shaped member that is formed as a part of a wall of the duct and vibrates in response to sound. A structure including the membrane-shaped member and a rear surface closed space thereof causes acoustic resonance to occur, transmits the acoustic resonance from the sound source into the duct, and suppresses sound radiated from the other end portion of the duct on a downstream side. The external sound source is at a distance within a wavelength at a frequency of the acoustic resonance on the outside from the end portion of the duct.

Herein, it is preferable that the fluid is a gas, and flows in the duct from the upstream side to the downstream side as at least one of wind or an air flow including heat, and in the duct, a direction in which the fluid flows and a membrane surface of the membrane-shaped member are parallel to each other. An inclination between the direction in which the fluid flows and the membrane surface of the membrane-shaped member may be less than 45°.

In addition, it is preferable that the sound source is a sound source that generates predominant sound of which a sound pressure at at least one specific frequency is maximum.

In addition, it is preferable that the sound source is a fan, and the predominant sound is sound, which is generated by a blade forming the fan and a rotation speed and is emitted from the fan to an outside.

In addition, it is preferable that the membrane-shaped member is attached to an opening provided in a part of the wall of the duct.

In addition, it is preferable that an edge portion of the membrane-shaped member is a fixed end.

In addition, it is preferable that the membrane-shaped member is formed to vibrate by making a part of the wall of the duct thin.

In addition, it is preferable that the structure including the membrane-shaped member and a rear surface closed space thereof is a membrane-type resonance structure in which a resonant frequency is determined by the membrane-shaped member and the rear surface closed space.

In addition, it is preferable that the membrane-type resonance structure is a structure in which a sound absorption coefficient of higher-order vibration is higher than a sound absorption coefficient of fundamental vibration.

In addition, it is preferable that the membrane-shaped members or the membrane-type resonance structures are disposed in a plurality of rows in a flow passage direction of the duct.

In addition, it is preferable that in a case where a Young's modulus of the membrane-shaped member is denoted by E (Pa), a thickness is denoted by t (m), a thickness of the rear surface space is denoted by d (m), and a circle equivalent diameter of a region where the membrane-shaped member vibrates is denoted by Φ (m), hardness $E\times t^3$ ($Pa\times m^3$) of the membrane-shaped member is $21.6\times d^{-1.25}\times \Phi^{4.15}$ or less.

In addition, it is preferable that the membrane-shaped member has a mass distribution.

In addition, it is preferable that a weight is attached to the membrane-shaped member.

In addition, it is preferable that the weight is attached to the rear surface of the membrane-shaped member.

In addition, it is preferable that for at least one membrane-shaped member or at least one membrane-type resonance structure, in a case where a wavelength determined from a frequency at which a sound pressure of sound generated by the sound source is maximum is denoted by λ and an integer of 0 or more is denoted by m, a center of the membrane-shaped member is positioned at a distance which is larger than ($m\times\lambda/2-\lambda/4$) and is smaller than ($m\lambda/2+\lambda/4$) from a position of the sound source.

In addition, it is preferable that for at least one membrane-shaped member or at least one membrane-type resonance structure, in a case where a wavelength determined from a frequency at which a sound pressure of sound generated by the sound source is maximum is denoted by λ, a center of the membrane-shaped member is positioned at a distance which is less than λ/4 from a position of the sound source.

In addition, it is preferable that the duct is a case that surrounds at least a part of the sound source.

In addition, it is preferable that the sound source is a fan, the duct is a fan casing that surrounds the fan, and the membrane-shaped member is attached to the fan casing.

In addition, it is preferable that as there are a reflection interface (which is to be a high impedance interface), which reflects, at a frequency at which a sound pressure of sound generated by the sound source is maximum, at least some of the sound with a surface where an impedance change occurs on a high impedance side from the sound source in the duct, the sound source, and the membrane-shaped member, externally radiating sound toward an opposite side to the reflection interface is suppressed.

In addition, it is preferable that for at least one membrane-shaped member or at least one membrane-type resonance structure, in a case where a wavelength determined from the frequency at which the sound pressure of the sound generated by the sound source is maximum is denoted by λ and an integer of 0 or more is denoted by m, a center of the membrane-shaped member is positioned at a distance which is larger than $m\times\lambda/2-\lambda/4$ and is smaller than $m\times\lambda/2+\lambda/4$ from the reflection interface that causes the acoustic impedance change.

In addition, it is preferable that for at least one membrane-shaped member or at least one membrane-type resonance structure, in a case where the wavelength determined from the frequency at which the sound pressure of the sound generated by the sound source is maximum is denoted by λ, the center of the membrane-shaped member is positioned at a position within ±λ/4 (m=0) from the high impedance interface.

In addition, it is preferable that a reflection portion including the reflection interface, the sound source, and the membrane-shaped member are disposed at a distance within λ/2, and suppress radiating sound toward an opposite side to the reflection portion.

In the acoustic system, as the small membrane-type resonance structure is disposed in a flow passage horizontal direction, wind does not directly hit the membrane surface perpendicularly. Since the acoustic system does not have a through hole or a hole, wind noise can be eliminated.

In addition, in the present invention, since a small sound absorption structure can be realized, there is a great advantage that fan noise can be muffled with a small size.

In addition, in the present invention, the weight of the duct can be reduced by replacing the duct with the membrane surface.

DESCRIPTION OF THE PREFERRED EMBODIMENTS

An acoustic system according to an embodiment of the present invention will be described in detail below based on suitable embodiments shown in the accompanying drawings.

Although the description of configuring elements described below is based on a representative embodiment of the present invention, the present invention is not limited to such an embodiment.

In addition, in the present specification, a numerical range represented by using "to" means a range including numerical values before and after "to" as a lower limit value and an upper limit value.

In addition, in the present specification, "orthogonal" and "parallel" include a range of errors allowed in the technical field to which the present invention belongs. For example, "orthogonal" and "parallel" mean that an error is within ±20° with respect to orthogonal or parallel in a strict sense, and an error with respect to orthogonal or parallel in a strict sense is preferably 10° or less, more preferably 5° or less, and even more preferably 3° or less.

In the present specification, the "same" includes a range of an error generally allowed in the technical field. In addition, in the present specification, when the term "entire", "all" or "full scale" is used, a range of an error generally allowed in the technical field is included, for example, a case of 99% or more, 95% or more, or 90% or more is included in addition to a case of 100%.

[Acoustic System]

A configuration of the acoustic system according to the embodiment of the present invention will be described with reference to the drawings.

Figure 1:
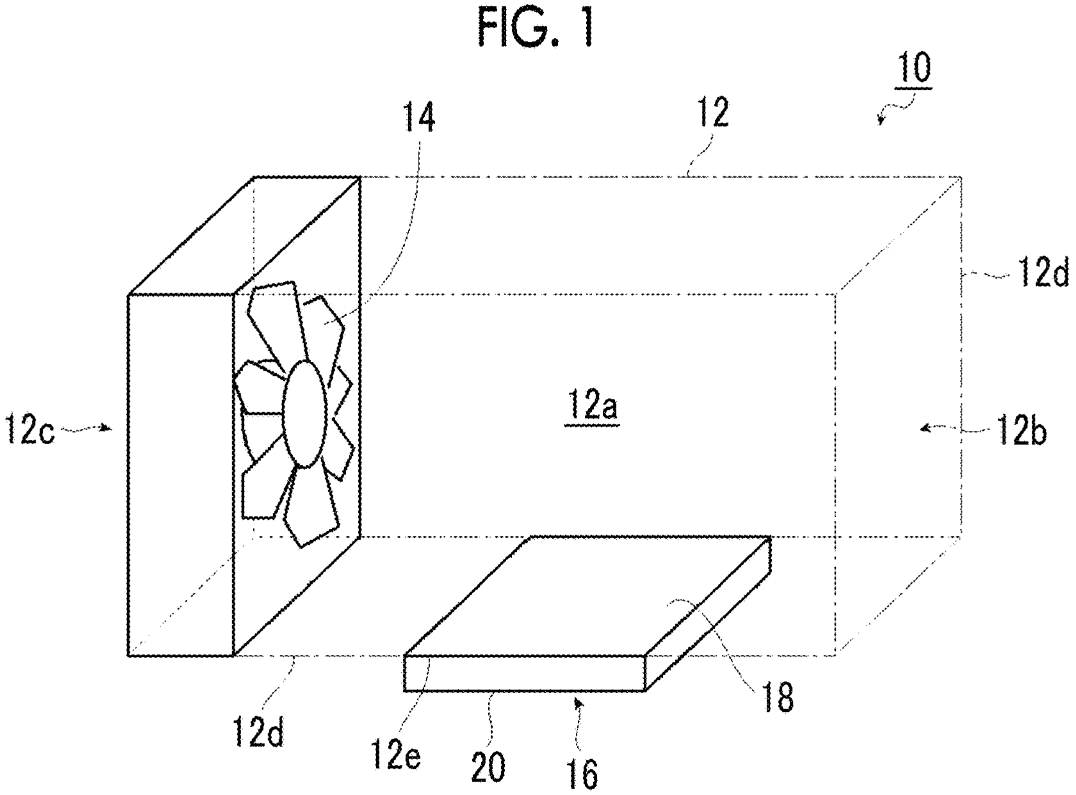
FIG. 1 is a perspective view schematically showing an example of an acoustic system according to an embodiment of the present invention.
Figure 2:
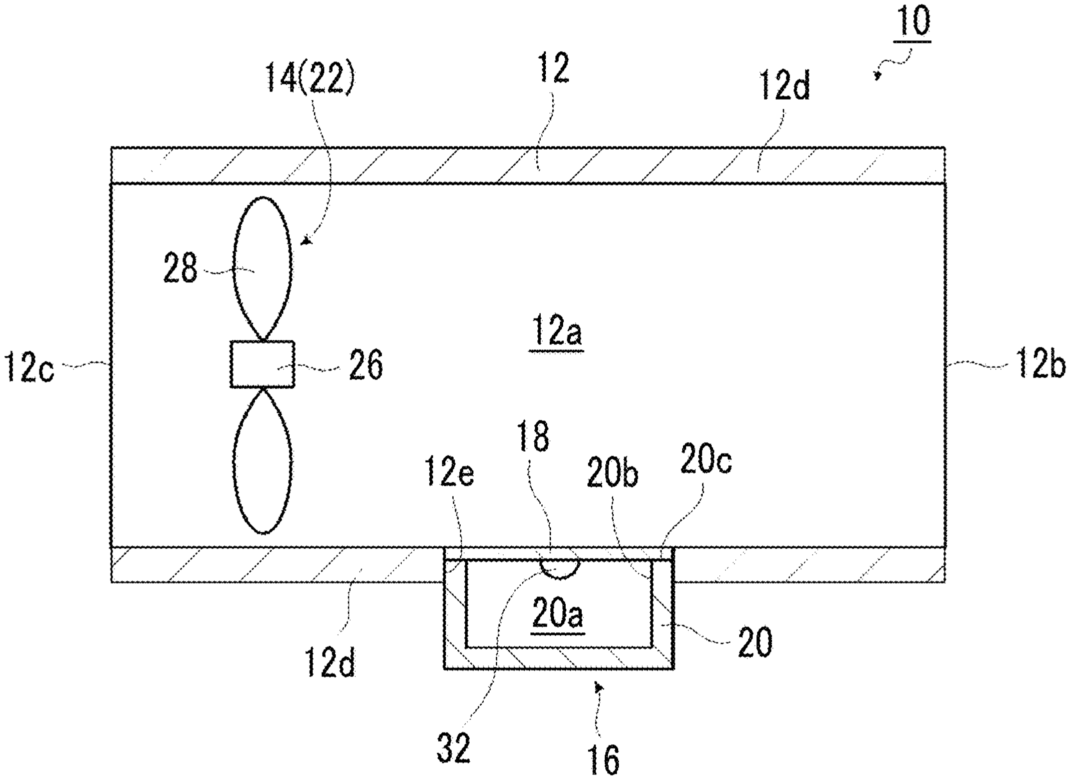
FIG. 2 is a cross sectional view schematically showing the acoustic system shown in FIG. 1.
Figure 3:
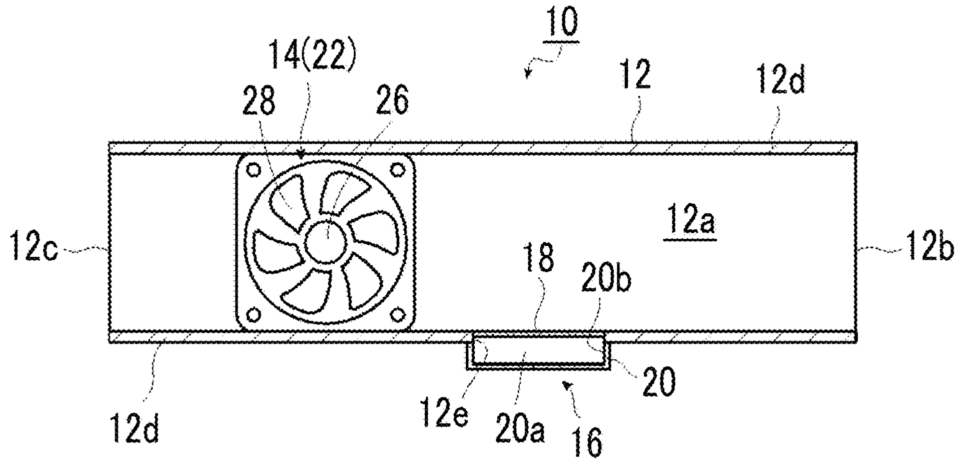
FIG. 3 is a schematic view showing the concept of the acoustic system shown in FIG. 1.
Figure 4:
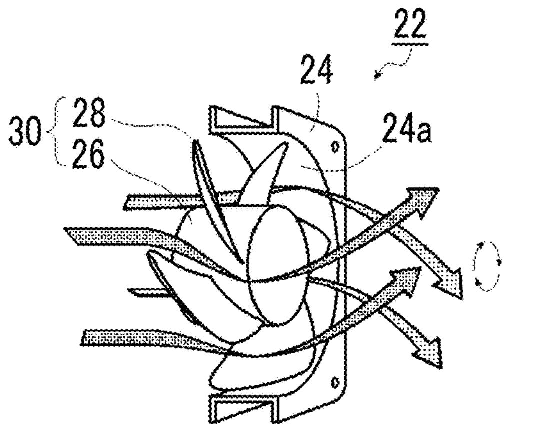
FIG. 4 is a partially broken perspective view of an example of a propeller fan used in the acoustic system shown in FIG. 1.

FIG. 1 is a perspective view schematically showing an example of the acoustic system according to the embodiment of the present invention. FIG. 2 is a schematic cross sectional view showing the concept of the acoustic system shown in FIG. 1. FIG. 3 is a schematic view showing the concept of the acoustic system shown in FIG. 1. FIG. 4 is a partially broken perspective view of an example of a propeller fan used in the acoustic system shown in FIG. 1.

Although the fan is shown facing the front with respect to a duct such that an air flow of the fan blows out from the front in FIG. 3, it is evident that FIG. 3 is a schematic view showing a position where the fan is provided and the air flow of the fan is parallel to the duct as shown in FIGS. 1 and 2. Although the fan of the acoustic system is shown in the same manner as in FIG. 3 in the following as well, the direction of the air flow from the fan is to be understood as parallel to the duct.

As shown in FIGS. 1 to 3, an acoustic system 10 has a quadrangular tubular duct 12, a fan 14 that is a sound source, and a membrane-type resonating body 16. The membrane-type resonating body 16 has a membrane-shaped member 18 and a frame 20.

[Duct]

As shown in FIGS. 1 to 3, the duct 12 is a tubular member that has a through-hole 12*a* having a quadrangular cross section and has an open end 12*b* at one end portion on a downstream side. As shown in FIGS. 2 and 3, an end portion of the duct 12 on an upstream side where the fan 14, which is a sound source, is disposed may be an open end 12*c*, or may be closed.

In addition, the duct 12 is provided with an opening 12*e* for attaching the membrane-shaped member 18, in a part of a wall 12*d* thereof.

The duct has a function of causing wind generated by the fan 14, a gas, a fluid such as an air flow, heat of a fluid, or the like to flow therein. In addition, the duct 12 also propagates sound generated by the fan 14 simultaneously.

The duct 12 is a duct, for example, a ventilation port where the fan 14 is provided, an air conditioning duct, or the like. The duct 12 is not particularly limited insofar as the fan 14 is provided, and may be a ventilation port, an air conditioning duct, or the like of a building, a house, an automobile, a train, an airplane, or the like, a duct or the like for electronic devices, such as a desktop personal computer (PC), a projector, and a server (computer server or the like), and a cooling fan particularly used in electronic devices, and a general duct and a general vent hole used for home appliances such as a ventilation fan, a dryer, a vacuum cleaner, a fan, a blower, and a dishwasher and various types of devices such as electrical devices.

In addition, a cross sectional shape of the through-hole 12*a* of the duct 12 is not limited to a quadrangular shape, and may be various shapes such as a circular shape, an elliptical shape, and a polygonal shape including a triangular shape.

In addition, although the through-hole 12*a* of the duct 12 shown in FIGS. 1 to 3 has the same dimension in a length direction, the present invention is not limited thereto, and the cross sectional shape of the through-hole 12*a* may be reduced, or may be enlarged. That is, an inner wall surface of the through-hole 12*a* of the duct 12 may be inclined, or a step may be attached as in an acoustic system 10B shown in FIG. 6.

Figure 6:
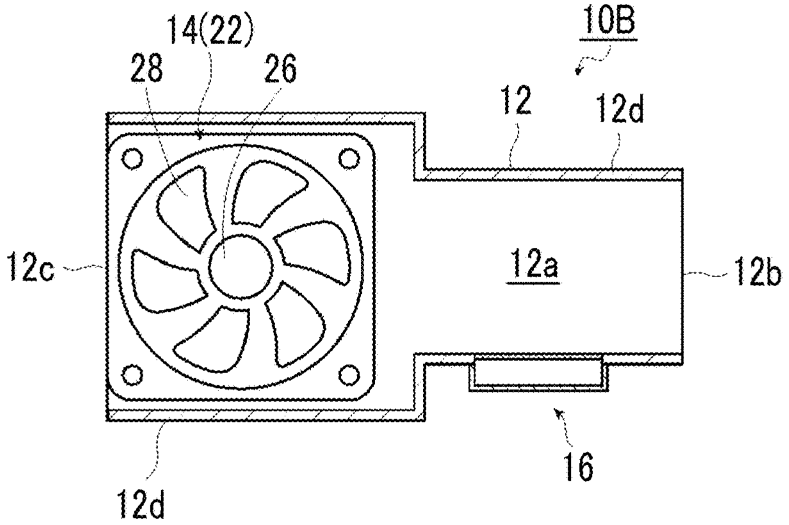
FIG. 6 is a schematic view schematically showing an example of the concept of an acoustic system according to still another embodiment of the present invention.

For example, although there are many cases where a dryer and a vacuum cleaner have a structure in which a portion of a motor fan is large and the vicinity of an opening portion is more narrowed down, the structure can be regarded as a duct to which a step is attached as shown in FIG. 6.

Figure 7:
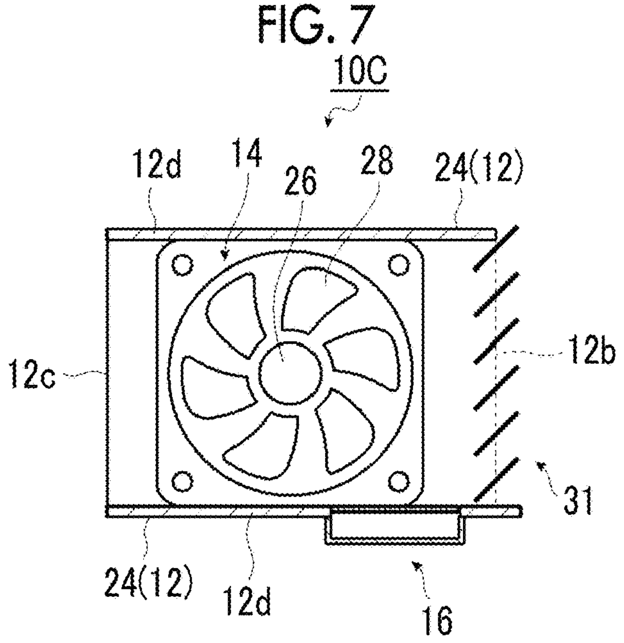
FIG. 7 is a schematic view schematically showing an example of the concept of an acoustic system according to still another embodiment of the present invention.

In addition, the length of the duct 12 is not particularly limited insofar as the fan 14, which is a sound source, can be disposed inside the duct 12 on the upstream side or at an outer peripheral portion of the duct 12 on the upstream side, or the duct may have a sufficient length up to the open end 12*b* on the downstream side as shown in FIGS. 1 to 3. That is, a casing and a tubular body connected thereto may configure the duct 12. In addition, as in an acoustic system IOC shown in FIG. 7, the duct 12 may be a tubular body configuring a casing 24 of the fan 14. In addition, similarly, as in FIG. 7, the casing 24 of the fan 14 may configure the duct 12.

That is, the duct 12 is preferably a casing surrounding at least a part of the sound source. That is, the sound source is the fan 14, and the duct 12 is the casing 24 of the fan 14 surrounding the fan, which is the sound source. From a viewpoint of making the entire structure small, it is preferable that the membrane-shaped member 18 and the frame 20 (the membrane-type resonating body 16) are attached to the casing 24 of the fan 14.

In a case where the cross sectional shape of the through-hole 12*a* of the duct 12 is circular, the diameter of the through-hole 12*a* (the inner diameter of the duct 12) is measured with the resolution of 1 mm. In a case where the cross sectional shape of the duct is not circular, it is preferable to convert the area to a diameter as an area equivalent to a circle to acquire the inner diameter. In a case of having a fine structure such as unevenness of less than 1 mm, it is preferable to average the fine structure.

The material for the duct 12 is not particularly limited, but is preferably a metal or a resin. Examples of the metal include metals, such as aluminum, copper, tin, stainless steel (SUS), iron, steel, titanium, magnesium, tungsten, chromium, hot-dip galvanized steel, aluminum-zinc alloy plated steel sheet (galvalume steel sheet (registered trademark)), vinyl chloride coated steel, and various types of alloy materials. Examples of the resin include resin materials such as acryl, polycarbonate, polypropylene, vinyl chloride, urethane, urethane foam (a lightweight duct can be formed by using foam), a polyvinyl chloride resin (PVC), and synthetic resins thereof.

[Fan]

The fan 14 is an internal sound source that generates a fluid (wind and/or an air flow including heat) flowing in the duct 12 and is disposed inside the duct 12 on the upstream side or at the outer peripheral portion of the duct 12 communicating with the inside of the duct 12 on the upstream side.

As the internal sound source, the fan 14 is a sound source that generates specific frequency sound of which a sound pressure at least one specific frequency is maximum, that is, predominant sound. The predominant sound is defined as narrow band sound, and a peak sound pressure thereof is 3 dB or more higher than sound outside the band. This is because the sound can be sufficiently detected in a case where there is a difference of 3 dB.

The fan 14 is not particularly limited insofar as a fan generates a fluid flowing in the duct 12, is an internal sound source, and can be disposed inside the duct 12 on the upstream side or at the outer peripheral portion thereof. A known fan in the related art can be used. Examples of the fan 14 include a propeller fan, an axial-flow fan, a blower fan, a sirocco fan, a cross flow fan, a mixed flow fan, a radial fan, a turbo fan, an air foil fan, and a plug fan.

For example, as a propeller fan or an axial-flow fan, which is used as the fan 14, has a plurality of blades and the plurality of blades rotate at a predetermined rotation speed, an air flow flowing in the duct 12 is generated, and predominant sound at a specific frequency, which is generated depending on the number and rotation speed of the blades configuring the fan 14 and is emitted from the fan 14 to the outside, is generated. In a normal fan with symmetrically disposed blades, rotation of 1/(the number of blades) results in the same disposition as the original disposition. That is, there is periodicity attributable to symmetry with respect to the rotation of 1/(the number of blades). At this time, the fundamental frequency (Hz) of predominant sound is determined by the number of blades×rotation speed (rps). At the fundamental frequency and an integral multiple frequency thereof, predominant sound is generated.

Such a propeller fan is shown in FIG. 4. A propeller fan 22 shown in FIG. 4 has the casing 24 that has a circular through-hole 24*a* and a fan main body 30 that consists of a propeller 28 having a plurality of blades attached to an outer periphery of a circular hub 26 at the center at equal intervals, that is, five blades in FIG. 4, in the casing 24. The propeller fan 22 sucks a gas from the right in the drawing as shown by an arrow in the drawing, generates an air flow blown from the left, and generates predominant sound. The predominant sound is sound at a specific frequency depending on five, which is the number of blades of the propeller 28, and the rotation speed of the propeller 28.

Figure 8A:
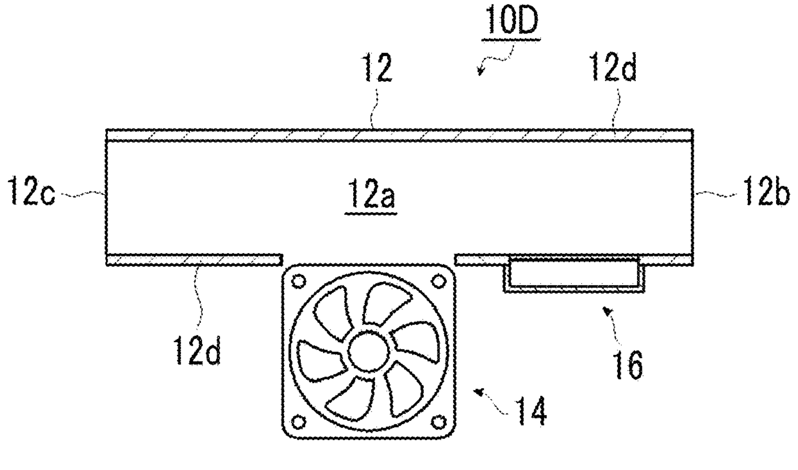
FIG. 8A is a schematic view schematically showing an example of the concept of an acoustic system according to still another embodiment of the present invention.
Figure 8B:
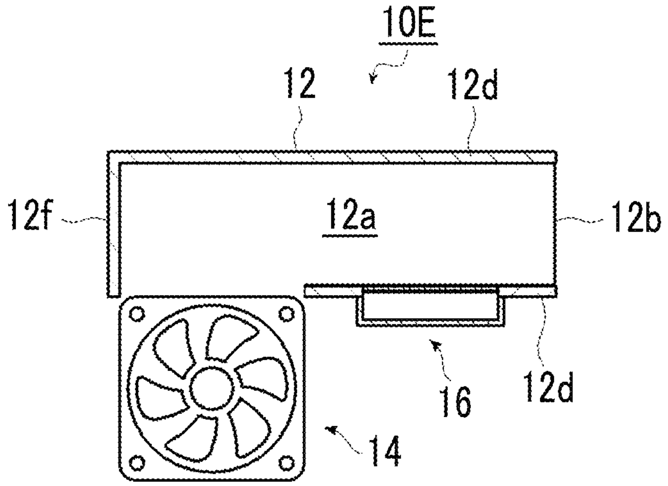
FIG. 8B is a schematic view schematically showing an example of the concept of an acoustic system according to still another embodiment of the present invention.

In a case where, for example, a blower fan, a sirocco fan, or a cross flow fan is used as the fan 14, as in acoustic systems 10D and 10E shown in FIGS. 8A and 8B, the fan 14 may be attached to the outer peripheral portion of the duct 12, an outlet of the fan 14 may be provided in the outer peripheral portion of the duct 12, and wind may be blown into the duct 12 perpendicularly to a direction in which a fluid flows in the duct 12.

In addition, as shown in FIG. 8B, the fan 14 may be attached to an outer peripheral portion of the duct 12 on the other end portion side, and the other end portion of the duct 12 may be a closed end portion 12*f*.

In the present invention, the fan 14 that is disposed in the duct 12 and generates noise is the most important sound source. In addition, a case where although a fan is attached to a ventilation fan, a range hood, or the like, there is a fan and wind or the like flows, that is, a case where the fan is not a sound source but sound coming in from the outside is a sound source, and the like are given as examples. In addition, there is unevenness or a duct side wall opening portion at a flow passage to which the fan is attached, and wind noise generated therein itself is also a sound source.

Therefore, in the present invention, an internal sound source that is disposed inside the duct 12 or at the outer peripheral portion of the duct 12, which communicates with the inside of the duct 12, an external sound source that is at a distance within a wavelength at a frequency of acoustic resonance on the outside from the end portion of the duct 12, and the like are described as sound sources.

[Membrane-Type Resonating Body]

The membrane-type resonating body 16 has the membrane-shaped member 18 that is configured as a part of a wall of the duct 12 and vibrates in response to sound and the frame 20 that configures a rear surface closed space 20*a* of the membrane-shaped member 18.

The membrane-type resonating body 16 causes acoustic resonance by a structure including the membrane-shaped member 18 and the rear surface closed space 20*a* of the frame 20 on a rear surface thereof, and suppresses sound that is transmitted from the fan 14, which is a sound source, into the duct 12 and is radiated from the end portion of the duct 12 on the downstream side. The structure including the membrane-shaped member 18 and the rear surface closed space 20*a* thereof is preferably a membrane-type resonance structure (membrane-type sound absorbing structure) in which a resonant frequency is determined by the membrane-shaped member 18 and the rear surface closed space 20*a*. That is, the membrane-type resonating body 16 exhibits a muffling function with the use of the membrane vibration of the membrane-shaped member 18 and selectively muffles sound at a specific frequency (frequency band).

Figure 5:
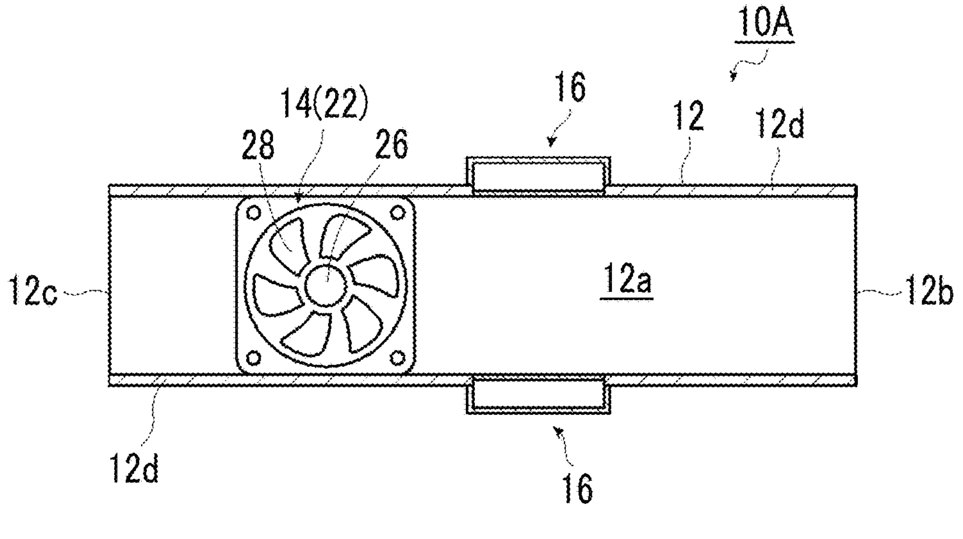
FIG. 5 is a schematic view schematically showing an example of the concept of an acoustic system according to another embodiment of the present invention.

Although the membrane-type resonating body 16 is attached to one wall 12*d* of the duct 12 having a quadrangular cross section in the examples shown in FIGS. 1 to 3, the present invention is not limited thereto, as in the acoustic system 10A shown in FIG. 5, the membrane-type resonating bodies may be attached to two upper and lower walls 12*d* in the drawing, or may be attached to all of four walls 12*d*. Also in a case where the duct 12 has a cylindrical shape, the outer periphery may be divided into several portions, and the membrane-type resonating bodies may be attached to some of the divided portions preferably symmetrically, or may be attached to the entire periphery.

In addition, it is preferable that the membrane-type resonance structure is a structure in which a sound absorption coefficient of higher-order vibration is higher than a sound absorption coefficient of fundamental vibration.

The peak frequency of the sound absorption coefficient becomes high by making the thickness of the rear surface closed space small. At this time, in a case where the membrane-shaped member 18 is particularly thin (more accurately, hardness is low), not only the peak frequency becomes high continuously when the thickness of the rear surface closed space is made small but also a new sound absorption peak appears further on a high frequency side. Consequently, in a case where a rear surface distance is made small, the sound absorption coefficient of a high frequency side peak becomes gradually higher than the sound absorption coefficient of a low frequency side peak. That is, in a case where a frequency at which a sound absorption coefficient is maximum is shown with respect to a rear surface distance, there is a discontinuous leap. This characteristic shows that a vibration mode in which a sound absorption coefficient is maximum shifts from a fundamental vibration mode to a higher-order vibration mode or a higher mode of the higher-order vibration mode. That is, in a case where the higher-order vibration mode is a state where excitation occurs easily due to the particularly thin membrane, by making the thickness of the rear surface space small, effects of sound absorption caused not only by the fundamental vibration mode but also by the higher-order vibration mode appear greatly. Accordingly, a sound absorption coefficient which is high in a high frequency range is not attributable to the fundamental vibration mode, but is caused by resonance in the higher-order vibration mode.

The membrane-shaped member 18 of the membrane-type resonating body 16 is configured as a part of the wall 12*d* of the duct 12, and vibrates in response to sound. At this time, a membrane surface of the membrane-shaped member 18 is preferably parallel to a direction in which a fluid flows in the duct 12, but may be inclined insofar as the membrane surface forms less than 45° with respect to the direction in which the fluid flows. This inclination angle is more preferably less than 30°, even more preferably less than 15°, and most preferably less than 10°.

In addition, on a rear surface side (a frame 20 side) of the membrane-shaped member 18 of the membrane-type resonating body 16, the rear surface closed space 20*a* surrounded by the frame 20 and the membrane-shaped member 18 is formed by the frame 20. The rear surface closed space 20*a* is a closed space.

The membrane-shaped member 18 is a thin membrane-shaped or foil-shaped member, and is attached to the opening 12*e* provided in a part of the wall 12*d* of the duct 12 directly or after being fixed to an open end 20*c* of the frame 20.

In addition, the membrane-shaped member 18 may be formed to vibrate as a part of the wall 12*d* of the duct 12 is made thin. By doing so, it is not necessary to use an adhesive or the like in order to fix the membrane-shaped member 18 to the wall 12*d* of the duct 12. In addition, since the membrane-shaped member 18 is made of the same material as the wall 12*d* of the duct 12, the same durability and the like as the duct are guaranteed.

As shown in FIG. 2, in a case of a condition of being fixed to the opening end 20*c* of the frame 20, it is preferable to fix the membrane-type resonating body 16, which is manufactured by fixing a peripheral edge portion (edge portion) of the membrane-shaped member 18 to the opening end 20*c* of an opening portion 20*b* of the frame 20, to the opening 12*e* of the wall 12*d* of the duct 12 so that the membrane-shaped member 18 covers the opening portion 20*b* of the frame 20. That is, the peripheral edge portion of the membrane-shaped member 18 is preferably a fixed end. In this case, the entire peripheral edge portion of the membrane-shaped member 18 may be fixed to the opening end 20*c* of the frame 20, or only a part thereof may be fixed. In this manner, the peripheral edge portion is supported by the frame 20 so as to be able to vibrate, and the frame 20 is fixed to the wall 12*d* of the duct 12.

As shown in FIG. 3, in a case where the membrane-shaped member 18 is directly attached to the opening 12*e* of the wall 12*d* of the duct 12, the peripheral edge portion of the membrane-shaped member 18 may also be fixed to an end surface of the opening 12*e*, or the peripheral edge portion of the membrane-shaped member 18 may be fixed to a portion of the wall 12*d* of a peripheral edge portion of the opening 12*e*. In this case, the entire peripheral edge portion (edge portion) of the membrane-shaped member 18 may be fixed to the end surface of the opening 12*e* or a portion of the wall 12*d* of the peripheral edge portion of the opening 12*e*, or only a part thereof may be fixed. In this manner, the membrane-shaped member 18 is supported by the opening 12*e* of the wall 12*d* of the duct 12 so as to be able to vibrate.

As shown in FIG. 2, it is preferable that a weight 32 is attached to a rear surface of the membrane-shaped member 18 on a rear surface closed space 20*a* side particularly in a case of a resonating body responding to low frequency sound. That is, the membrane-shaped member preferably has a mass distribution. By attaching the weight 32, the membrane-shaped member has the mass distribution. Consequently, the vibration mode can be changed, and the resonant frequency of the membrane-type resonating body 16 can be changed and adjusted, becoming likely to respond to the low frequency side in particular. The weight 32 may be attached to a surface side of the membrane-shaped member 18. As shown in FIG. 2, as the weight 32 is attached to an opposite side (the rear surface closed space 20*a* side) to the inside of the duct 12, there is no unevenness caused by the weight on a duct 12 side, and the membrane-shaped member 18 with the weight 32 can be used without generating new wind noise.

A material for the membrane-shaped member 18 is not particularly limited, and can be selected depending on the acoustic unit 10, a muffling environment thereof, and the like, insofar as, in a case of being made into a membrane-shaped material or a foil-shaped material, the material has strength suitable for applying to a muffling target object described above, is resistant to a muffling environment of the acoustic unit 10, and is possible to membrane-vibrate in order for the membrane-shaped member 18 to perform muffling by absorbing or reflecting the energy of sound waves. Examples of the material for the membrane-shaped member 18 include a resin material that can be made into a membrane shape, such as polyethylene terephthalate (PET), triacetyl cellulose (TAC), polyvinylidene chloride (PVDC), polyethylene (PE), polyvinyl chloride (PVC), polymethylpentene (PMP), cycloolefin polymer (COP), zeonoa, polycarbonate, polyethylene naphthalate (PEN), polypropylene (PP), polystyrene (PS), polyarylate (PAR), aramid, polyphenylene sulfide (PPS), polyethersulfon (PES), nylon, PEs (polyester), cyclic olefin copolymer (COC), diacetyl cellulose, nitrocellulose, cellulose derivative, polyamide, polyamideimide, polyoxymethylene (POM), polyetherimide (PEI), polyrotaxane (slide ring material and the like), and polyimide, various types of metal materials, such as aluminum, titanium, nickel, permalloy, 42 alloy, coval, nichrome, copper, beryllium, phosphorus bronze, brass, nickel silver, tin, zinc, iron, tantalum, niobium, molybdenum, zirconium, gold, silver, platinum, palladium, steel, tungsten, lead, and iridium, other materials that are made into a fibrous membrane such as paper and cellulose, types of rubber including natural rubber, chloroprene rubber, butyl rubber, EPDM, silicone rubber, and a crosslinked structure thereof, a nonwoven fabric, a film containing nano-sized fiber, a porous material such as thinly processed urethane and synthlate, a carbon material processed into a thin membrane structure, and a material or a structure that can form a thin structure, such as a fiber reinforced plastic material, including carbon fiber reinforced plastic (CFRP) and glass fiber reinforced plastic (GFRP).

In the examples shown in FIGS. 1 to 3, the frame 20 has a rectangular parallelepiped shape, in which the rectangular opening portion 20*b* is formed in one surface and a rectangular bottom surface facing the opening portion 20*b* and four side surfaces are closed. That is, the frame 20 has a bottomed rectangular parallelepiped shape with one open surface.

Alternatively, it is also preferable to provide a small through-hole (opening portion) in the four side surfaces other than the opening portion of the frame 20, or a rear surface plate. Even in a case where a hole sufficiently smaller than a side surface size is formed, the hole can be treated as a substantially closed space for an acoustic phenomenon. On the other hand, by ventilating inside and outside the frame 20, a difference between inside and outside pressures caused by a change in the atmospheric pressure, a change in a temperature, and the like can be eliminated. In a case where the difference between inside and outside pressures occurs, tension is applied to the membrane-shaped member 18, causing a change in the characteristic. Thus, it is desirable that the difference between inside and outside pressures is small. In addition, dew condensation caused by humidity can also be prevented. Since there is a possibility of becoming a generation source of wind noise in a case where there is a through-hole in the membrane surface disposed on a duct flow passage side, by having a through-hole in another surface, durability and robustness with respect to a pressure, a temperature, and the like can be increased while preventing wind noise.

As shown in FIG. 2, it is preferable that the frame 20 has the rear surface closed space 20*a* formed on the rear surface of the membrane-shaped member 18 as the peripheral edge portion of the membrane-shaped member 18 is attached to the opening end 20*c* of the opening portion 20*b* so that the opening portion 20*b* is covered, and supports the membrane-shaped member 18 so as to be able to vibrate.

In addition, as shown in FIG. 3, it is preferable that the frame 20 has the rear surface closed space 20*a* formed on the rear surface of the membrane-shaped member 18 by being attached to cover the opening 12*e* of the wall 12*d* of the duct 12, to which the peripheral edge portion of the membrane-shaped member 18 is attached, and supports the membrane-shaped member 18 so as to be able to vibrate.

In addition, the shapes of the frame 20 and the opening portion 20*b* thereof are planar shapes and rectangles in the examples shown in FIGS. 1 to 3, respectively, but are not particularly limited in the present invention, and may be, for example, polygonal shapes including quadrangles, such as a rectangular shape, a rhombus, and a parallelogram, triangles, such as a regular triangle, an isosceles triangle, and a right triangle, and regular polygons, such as a regular pentagon and a regular hexagon, circles, ellipses, or the like, or may be irregular shapes. In addition, the shapes of the frame 20 and the opening portion 20*b* thereof are both rectangular shapes in the examples shown in FIGS. 1 to 3, but are not particularly limited in the present invention. The shapes may be the same or may be different from each other.

The sizes of such a frame 20 and such an opening portion 20*b* are not particularly limited, and may be set depending on a ventilation port, an air conditioning duct, or the like of a building, a house, an automobile, a train, and an airplane, or the like where the duct 12, which is a muffling target object applied in order to muffle the acoustic system 10 of the embodiment of the present invention, for example, the fan 14 described above is provided, a duct for electronic devices, such as a desktop personal computer, a projector, and a server (computer server or the like), and a cooling fan particularly used in electronic devices, a general duct, a general vent hole, or the like used for various types of devices including home appliances, such as a ventilation fan, a dryer, a vacuum cleaner, a fan, a blower, and a dishwasher, and electrical devices.

In addition, the sizes of the frame 20 and the opening portion 20*b* thereof are sizes in plain view. In a case of a circle or a regular polygonal shape such as a square, a distance between facing sides passing through a center thereof, or a circle equivalent diameter can be defined. In a case of a polygonal shape, an ellipse, or an irregular shape, a circle equivalent diameter can be defined. In the present invention, a circle equivalent diameter and a radius are a diameter and a radius when converted into circles having the same area, respectively.

A material for the frame 20 is not particularly limited, and can be selected depending on a muffling target object and a muffling environment thereof insofar as the material can support the membrane-shaped member 18, has strength suitable for applying to the acoustic unit 10 described above, and is resistant to the muffling environment of the acoustic unit 10. Examples of the material for the frame 20 include a metal material, a resin material, a reinforced plastic material, and a carbon fiber. Examples of the metal material include aluminum, titanium, magnesium, tungsten, iron, steel, chromium, chromium molybdenum, nichrome molybdenum, copper, and alloys thereof. In addition, examples of the resin material include an acrylic resin, polymethyl methacrylate, polycarbonate, polyamideid, polyarylate, polyetherimide, polyacetal, polyetheretherketone, polyphenylene sulfide, polysulfone, polyethylene terephthalate, polybutylene terephthalate, polyimide, an ABS resin (acrylonitrile-butadiene-styrene copolymer synthetic resin), polypropylene, and triacetyl cellulose. In addition, examples of the reinforced plastic material include carbon fiber reinforced plastics (CFRP) and glass fiber reinforced plastics (GFRP). In addition, examples of types of rubber include natural rubber, chloroprene rubber, butyl rubber, EPDM (ethylene-propylene-diene rubber), silicone rubber, and a crosslinked structure thereof. A structure containing air, that is, a foam material, a hollow material, a porous material, or the like can also be used as a frame material. In order to prevent ventilation between cells in a case where a large number of membrane-type soundproof structures are used, the frame can be formed by using, for example, a closed-cell foam material or the like. For example, various materials, such as closed-cell polyurethane, closed-cell polystyrene, closed-cell polypropylene, closed-cell polyethylene, and closed-cell rubber sponge, can be selected.

In addition, the plurality of types of materials for the frame 20 may be used in combination.

It is preferable that the membrane-type resonating body 16 is attachable and detachable to and from the wall 12*d* around the opening 12*e* of the duct 12 and is mountable on the duct 12 later.

In addition, it is preferable that a structure hooked on the opening 12*e* of the wall 12*d* of the duct 12 is attached to the membrane-type resonating body 16. By doing so, the membrane-type resonating body 16 can be attached to the wall 12*d*, for example, simply by pushing.

In addition, by replacing a rear surface portion of the frame 20 of the membrane-type resonating body 16, a muffling frequency can be customized.

In addition, by using a material for the membrane-shaped member 18 and the frame 20 as the main component of a duct material, effects of strain on heat and/or humidity can be decreased.

Figure 9A:
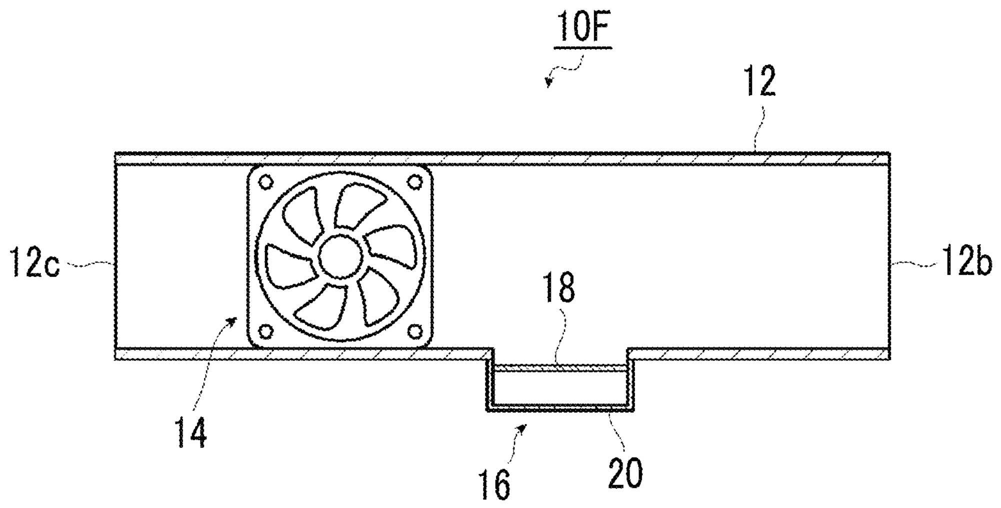
FIG. 9A is a schematic view schematically showing an example of the concept of an acoustic system according to still another embodiment of the present invention.
Figure 9B:
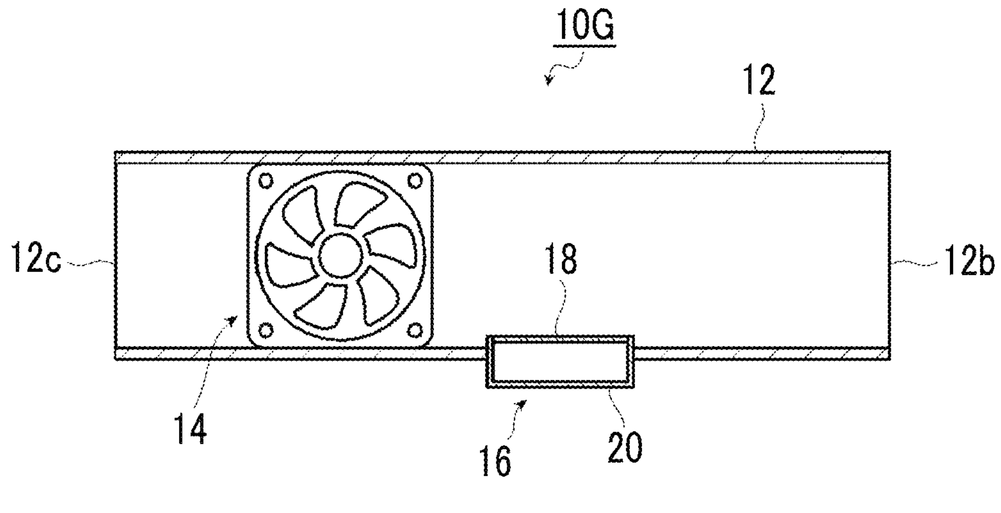
FIG. 9B is a schematic view schematically showing an example of the concept of an acoustic system according to still another embodiment of the present invention.

In addition, the membrane surface of the membrane-shaped member 18 may have unevenness, that is, a recess, and/or a protrusion on the wall 12*d* of the duct 12, as in acoustic systems 10F and 10G shown in FIGS. 9A and 9B. Herein, the unevenness (the recess and/or the protrusion) of the membrane surface of the membrane-shaped member 18 on the wall 12*d* of the duct 12 is preferably 10 mm or less, more preferably 5 mm or less, and even more preferably 2 mm or less. In this manner, wind noise can be prevented from being generated.

Herein, as a result of examining a mechanism by which the membrane-type resonating body 16 of the acoustic system 10 is excited in the higher-order vibration mode, the present inventor has found out the following.

With the Young's modulus of the membrane-shaped member 18 denoted by E (Pa), the thickness denoted by t (m), the thickness (rear surface distance) of the rear surface closed space 20*a* denoted by d (m), the circle equivalent diameter of a region where the membrane-shaped member 18 vibrates, that is, the diameter of the opening portion 20*b* of the frame 20, which is the full length of a circle in a case where the membrane-shaped member 18 is fixed to the frame 20, denoted by Φ (m), the hardness $E\times t^3$ ($Pa\times m^3$) of the membrane-shaped member 18 is preferably $21.6\times d^{-1.25}\times \Phi^{4.15}$ or less. Further, in a case where the hardness is expressed as $a\times d^{-1.25}\times\Phi^{4.15}$ with the use of a coefficient a, the coefficient a is 11.1 or less, 8.4 or less, 7.4 or less, 6.3 or less, 5.0 or less, 4.2 or less, and 3.2 or less, which means that the lower the coefficient a, the more preferable.

In addition, it has been found out that the hardness $E\times t^3$ ($Pa\times m^3$) of the membrane-shaped member 18 is preferably $2.49\times10^{-7}$ or more, is more preferably $7.03\times10^{-7}$ or more, is even more preferably $4.98\times10^{-6}$ or more, is still even more preferably $1.11\times10^{-5}$ or more, is particularly preferably $3.52\times10^{-5}$ or more, and is most preferably $1.40\times10^{-4}$ or more.

By setting the hardness of the membrane-shaped member 18 within the range, the membrane-type resonating body 16 of the acoustic system 10 can be suitably excited in the higher-order vibration mode.

The Young's modulus of the membrane-shaped member can be measured with the use of a dynamic measurement method using vibration, such as a free resonance natural vibration method, or a static measurement method, such as a tensile test and a compression test. In addition, physical property values such as a manufacturer's test table may be used.

Thickness measurement can be performed through various types of general measurement methods, such as a caliper, a profilometer, a laser microscope, and an optical microscope. In addition, physical property values such as a manufacturer's test table may be used.

Also the rear surface space thickness can be measured in the same manner as the thickness measurement. In addition, in a case where the rear surface distance of the frame is used as the rear surface space thickness, the thickness of the frame may be measured as it is.

Regarding the vibration of the membrane, there are fundamental vibration and higher-order vibration, and the higher-order vibration naturally has the order. As the order increases, the mode of membrane vibration gradually becomes closer to energy, and finally becomes indistinguishable. At this time, the springiness of the membrane does not actually affect resonance, and only the mass of the membrane (and the size of the rear surface distance) contributes to the resonance.

Sound absorption occurs also in this case, but absorption tends to be low. Accordingly, fundamental vibration and clear higher-order vibration (up to approximately 10th order) are desirable for a membrane-type sound absorber with high absorption.

In addition, in the present invention, by disposing the membrane-type resonance structures in a plurality of ducts, a larger muffling effect can be obtained. As for the disposition of the membrane-type resonance structures, a plurality of membrane-type resonance structures may be disposed in a duct cross section, or the membrane-type resonance structures may be disposed in a plurality of rows in a duct flow passage direction.

In addition, in a case where a wavelength determined by a frequency at which the sound pressure of sound generated by a sound source consists of the fan 14 is maximum is denoted by λ and an integer which is 0 or more is denoted by m, the center of the membrane-shaped member 18 is preferably positioned at a distance which is larger than $(m\times\lambda/2-\lambda/4)$ and is smaller than $(m\times\lambda/2+\lambda/4)$ from the position of the sound source (the fan 14). Further, the center is more preferably positioned at a distance which is larger than $(m\times\lambda/2-\lambda/8)$ and is smaller than $(m\times\lambda/2+\lambda/8)$, and is even more preferably at a distance which is larger than $(m\times\lambda/2-\lambda/12)$ and is smaller than $(m\times\lambda/2+\lambda/12)$.

In addition, in a case where a wavelength determined by a frequency at which the sound pressure of sound generated by the sound source (the fan 14) is maximum is denoted by λ, the center of the membrane-shaped member 18 is preferably positioned at a distance which is less than λ/4 from the position of the sound source (the fan 14). In addition, the center of the membrane-shaped member 18 is more preferably positioned at a distance less than λ/8, and is even more preferably positioned at a distance less than λ/12. In this case, the integer m=0 is satisfied.

By doing so, the center of the membrane-shaped member 18 can be shifted away from the position at a distance of (2n+1)×λ/4 (n is an integer of 0 or more), at which muffling is difficult, from the position of the sound source (the fan 14), and can be brought closer to the position of m×λ/2 (m is an integer of 0 or more), which is excellent in muffling.

The center of the membrane-shaped member 18 can be determined by the centroid position of the membrane-shaped member (membrane) 18. This is because vibration occurs around the centroid position.

In a case of sound generated from a vibrating body, such as a speaker, the measurement method of the position of the sound source can be determined by a vibrating surface position thereof. In a case of flowing noise as in the fan 14, the measurement method can be determined by the center position of the fan 14 (the center position of the blades).

The mechanism can be considered as follows. In a case where the membrane-shaped member is substantially parallel to the flow passage, for example, the membrane-shaped member is disposed as in FIG. 3, an interface has a high local speed and a small sound pressure. In a case where reflection occurs due to resonance, the interface is where a free end reflects the local speed and a fixed end reflects the pressure. At a position separated therefrom by (2n+1)×λ/4, the sound pressure is maximum. In a case where an external sound pressure at the sound source position is large, the amplitude of a pressure generated from the sound source is high, so that a muffling effect for amplifying sound is unlikely to be obtained. On the other hand, in a case where the center of the membrane-shaped member 18 is at the position of m×λ/2, the relationship is opposite to the case above. Thus, the sound pressure of the sound source is minimum, the disposition causes the sound not to be amplified, and the disposition causes a muffling effect to be likely to be obtained.

In addition, although related to a high impedance interface to be described later, particularly for an axial-flow fan and a propeller fan, the high impedance interface is almost at the same position as the fan, which is the sound source, as a duct diameter is narrowed by an axial portion. In addition, since high impedance interface reflection occurs as the fan rotates at a high speed, including other types of fans, the sound source position=high impedance reflection interface is satisfied often particularly in the case of the fan. Thus, position dependence described above appears greatly.

Insofar as the membrane surface is substantially parallel to the flow passage, a sound pressure interface has a maximum local speed. Therefore, this applies not only to the example shown in FIG. 3 but also to the examples shown in other drawings.

In addition, as there are a reflection interface that reflects, at a frequency (specific frequency of predominant sound) where the sound pressure of the sound generated by the sound source such as the fan 14, at least some of the sound with a surface on which an impedance change occurs on a high impedance side from the sound source in the duct 12, the sound source, and the membrane-shaped member 18, it is preferable to suppress externally radiating sound toward an opposite side to the reflection interface. As examples, a case where the high impedance interface in the duct is closed by a wall harder than an internal fluid, a case where of a structure in which a duct diameter is small, a case where a plate with a hole and/or a punching structure is disposed on a duct surface, a case where a louver is disposed, a case where a shaft is placed in a middle portion, and the like can be given.

That is, in a case where a propeller fan or an axial-flow fan is used as the fan 14, which is disposed in the duct 12 and is a sound source, a space for a casing and the like is narrow on the rear surface side of the fan 14 and an open end 12*c* side. Thus, there is a surface where an impedance change occurs on the high impedance side from the sound source such as the fan 14, and the surface is the reflection interface that reflects sound. In addition, for example, since a shaft itself of the axial-flow fan functions as a rigid body that narrows the flow passage, an axial-flow fan surface itself also functions as the high impedance interface.

In addition, in a case where a blower fan, a sirocco fan, or a cross flow fan is used as the fan 14, which is disposed in the duct 12 and is the sound source, the rear surface side of the fan 14, excluding an intake portion, is the closed end portion 12*f* and is closed as shown in FIGS. 9A and 9B and then reflection is performed also by blades of the rotating fan. Thus, the closed end portion 12*f* and the blades of the fan are the reflection interface where sound is reflected.

Therefore, in a case where a wavelength determined by a frequency at which the sound pressure of sound generated by the sound source such as the fan 14 is maximum is denoted by λ and an integer which is 0 or more is denoted by m, the center of the membrane-shaped member 18 is preferably positioned at a distance which is larger than m×λ/2−λ/4 and is smaller than m×λ/2+λ/4 from the reflection interface that causes an acoustic impedance change. Further, the center of the membrane-shaped member 18 is more preferably at a distance which is larger than (m×λ/2−λ/8) and is smaller than (m×λ/2+λ/8), and is even more preferably at a distance which is larger than (m×λ/2−λ/12) and is smaller than (m×λ/2+λ/12).

By doing so, the center of the membrane-shaped member 18 can be shifted away from the position at a distance of (2n+1)×λ/4 (n is an integer of 0 or more), at which muffling is difficult, from the reflection interface that causes an acoustic impedance change, and can be brought closer to the position of m×λ/2 (m is an integer of 0 or more), which is excellent in muffling.

The mechanism can be considered as follows. In a case where a resonance structure including the membrane-shaped member 18 causes resonance, an interface including the membrane-shaped member 18 is at a position where acoustic impedance is minimum. That is, a local speed causes reflection at the free end and a sound pressure causes reflection at the fixed end. On the other hand, for the interface reflection with the high impedance interface described above, a local speed causes reflection at the fixed end, and a sound pressure causes reflection at the free end. At this time, when a distance between a low impedance interface depending on the resonating body described above and the high impedance interface described above is (2n+1)×λ/4, a distance between the two interfaces and the amplitude of sound waves match each other, forming a resonance tube having end portions of a free end and a fixed end. In a case where a resonance phenomenon occurs in the duct in this manner, the internal sound pressure is amplified, so that also the externally radiating sound tends to be amplified. Accordingly, since a muffling effect caused by the membrane-shaped member 18 and an amplifying effect caused by resonance in the duct offset against each other, the disposition causes the muffling effect to be unlikely to be obtained.

For the disposition in the duct, the high impedance reflection interface, the sound source, the membrane-shaped member, and an open portion may be disposed in this order, or the sound source, the high impedance reflection interface, the membrane-shaped member, and the open portion may be disposed in this order. Examples of the case of the former include a structure where a louver is attached to the rear surface, there is the fan, and there is the opening portion through which wind is let out toward the front and a structure where the rear surface is narrowed down. Examples of the case of the latter, which is the high impedance reflection interface, include a case where a louver, a fixed blade structure, and/or a current plate are attached to the front of the fan.

On the other hand, in a case where the membrane-shaped member is disposed at the position of m×λ/2, the disposition causes a resonance phenomenon in the duct to be most unlikely to occur. Thus, a muffling effect caused by the membrane-shaped member 18 appears strongly, and the disposition causes a muffling effect of radiating sound to be most likely to occur.

In addition, it is preferable that a reflection portion which includes the high impedance reflection interface described above, the sound source, such as the fan 14, and the membrane-shaped member 18 are disposed at a distance within λ/2 and the radiating sound toward the opposite side to the reflection portion is suppressed.

By doing so, the size of the acoustic unit 10 can be made small.

It is more desirable that the range described above is within λ/4, and it is even more desirable that the range is within λ/6.

[Simulation 1]

In order to confirm the effects of the membrane-type resonating body 16 (membrane-type resonance structure) of the acoustic system 10 according to the embodiment of the present invention, a three-dimensional model was constructed to implement membrane vibration, and an acoustic simulation was performed using the finite element method calculation software COMSOL ver.5.3 (COMSOL Inc.).

[Duct Model]

As the acoustic system 10 shown in FIG. 2, calculation was performed through a duct model in which the duct 12 (one side was 75 mm) having a square cross section and a length from the internal sound source position to the end portion (the open end 12*b*) of the duct 12 was 120 mm. A model in which a free space was opened from the end portion of the duct 12 was adopted. Since an end portion interface (an opening surface of the open end 12*b*) open to the free space was an interface where an acoustic impedance change from a relatively high acoustic impedance side in the duct to a relatively low acoustic impedance of the free space occurred, the interface was a surface where reflection and transmission caused by the low impedance interface in accordance with the impedance difference occurred.

An object of the present invention is to suppress sound radiated from the open portion (the open end 12*b*) of the duct 12 to the space.

On the rear surface side of the internal sound source, a cylindrical rigid body wall (a hub 26) that had the middle of the duct simulating the shaft of the axial-flow fan, which was the fan 14, as a central shaft and had a diameter of 30 mm was disposed. Sound flowed through the outer peripheral portion (a portion that had a square shape of which one side was 75 mm, excluding a middle portion of (Φ 30 mm) of the cylindrical wall 12*d* in the duct 12. Since the flow passage diameter of the duct 12 was narrow due to the central shaft, acoustic impedance was high at this place. Accordingly, at the internal sound source position, an impedance change from low impedance to high impedance occurred due to the narrowing of the duct, and the reflection interface was formed.

As described above, the duct had the reflection interface where a change from high impedance to low impedance (outside) of the duct end portion occurred and the reflection interface where a change from a low impedance side to high impedance (the narrow duct) occurred on the rear surface side of the internal sound source. Although this model has simulated the axial-flow fan, without being limited to the axial-flow fan, a reflection interface caused by such high and low levels of impedance can be formed by various fans.

[Sound Source]

A point sound source simulating the axial-flow fan, which was the fan 14, was used as the internal sound source. Eight point sound sources simulating eight blades were disposed at equal intervals and rotationally symmetrically on the circumference of a circle having a diameter of 60 mm within the cross section of the duct 12 at the sound source position. The center position of the circle, the center of a shaft, and the center of the cross section of the duct 12 matched each other. Sound was radiated in the same phase from the eight point sound sources (eightfold symmetrical positions). This simulated radiating sound from the eight-blade fan.

[Membrane-Type Resonance Structure]

The muffling of approximately 2 kHz was mainly subjected to the simulation. As the membrane-type resonance structure, the membrane-type resonating body 16, in which a PET film having a thickness of 100 μm was used as the membrane-shaped member (hereinafter, also simply referred to as the membrane) 18, four ends of the PET film, which was the membrane-shaped member 18, was restrained by being fixed to the square opening portion 20*b* of the frame 20 of which one side was 30 mm, the thickness of the rear surface closed space 20*a* of the membrane-shaped member 18 was set to 5 mm, and a rear surface thereof was closed by a wall, was used. The resonance structure was obtained by the vibration of a thin membrane, which is the PET film of which four ends were fixed, and reflection by a rear surface wall of the frame 20 via the rear surface closed space 20*a*.

The design of the membrane-type resonating body 16 was characteristic in that the sound absorption coefficient of higher-order vibration was designed to be higher than the sound absorption coefficient of fundamental vibration. Although it was necessary to make a membrane body hard by increasing the thickness of the membrane-shaped member 18 in order to make the frequency of the fundamental vibration high, there was a problem that sound absorption and/or a phase change were unlikely to occur in a case of becoming a hard membrane that was difficult to vibrate, and it was difficult to obtain a membrane-type resonance structure that had a high frequency and a large muffling effect by using fundamental vibration. On the contrary, since a membrane can be used as the membrane-shaped member 18 by using higher-order vibration resonance, there is an advantage that high resonance effect can be obtained also on the high frequency side.

Figure 10:
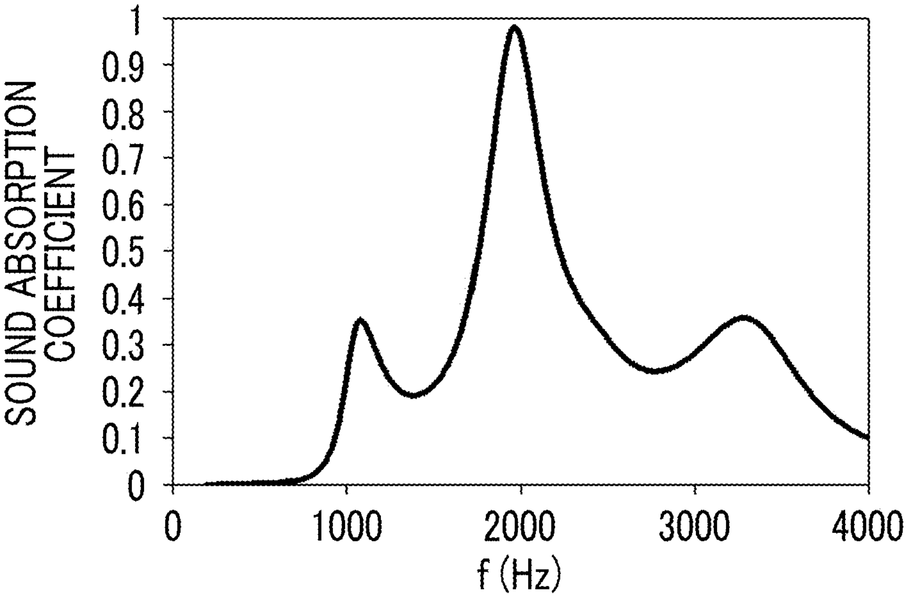
FIG. 10 is a graph of a normal incidence sound absorption coefficient of a membrane-type resonance structure of the acoustic system in Simulation 1.

FIG. 10 shows the normal incidence sound absorption coefficient of the membrane-type resonance structure, which is the membrane-type resonating body 16. Although sound absorption caused by fundamental vibration is approximately 1 kHz, the maximum value of the sound absorption is approximately 2 kHz, which is caused by higher-order vibration. Further, as shown in FIG. 1, it is a characteristic of the membrane-type resonance structure that resonance occurs at a plurality of frequencies. In addition, since there is no hole opened in the membrane-type resonance structure, there is a characteristic that new wind noise is not generated in response to the wind of the fan 14.

[Disposing Membrane-Type Resonance Structure in Duct]

Figure 13:
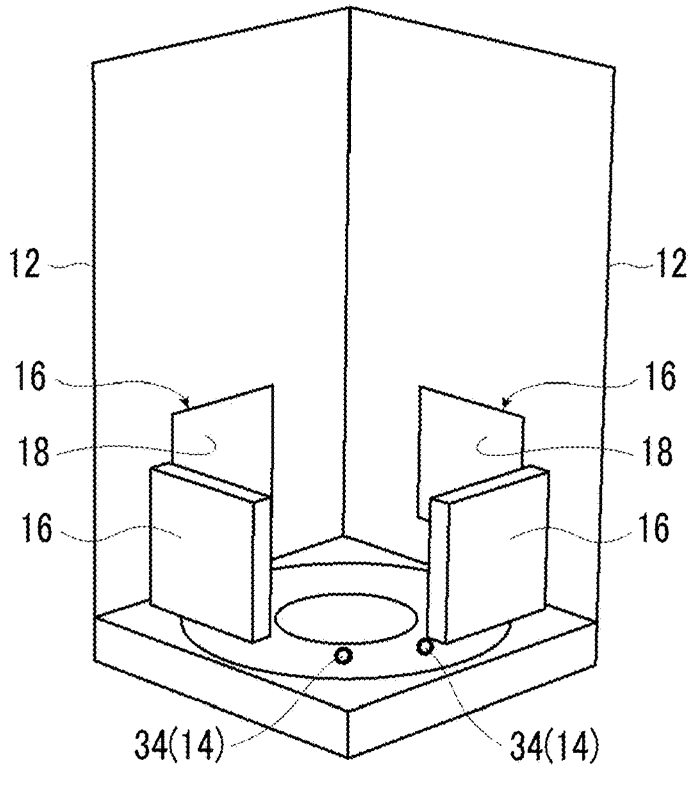
FIG. 13 is a three-dimensional perspective cross sectional view of a structure of Simulation 1 in which the membrane-type resonance structure is disposed in a duct.

Next, FIG. 13 shows a simulation structure in which the membrane-type resonance structure was disposed in the duct.

As shown in FIG. 13, the membrane-type resonance structure, which was the membrane-type resonating body 16, was disposed at a position separated from an internal sound source 34 of the duct 12 by 10 mm to an external radiation side. At this time, an interval between the center position of the membrane-type resonating body 16 and the position of the internal sound source 34 in the duct flow passage direction was 25 mm. Eightfold symmetrical disposition was adopted for the internal sound source 34.

Muffled sound volume in a case where the membrane-type resonance structure was disposed only on one surface of the quadrangular duct 12 and muffled sound volume in a case where four membrane-type resonance structures were disposed symmetrically on all four surfaces of the quadrangular duct 12 as shown in FIG. 13 were calculated. A portion separated from the internal sound source position by 10 mm in the duct flow passage direction was a wall (a reflection wall 36: refer to FIGS. 14A and 14B) on the rear surface side of the internal sound source 34, and calculation was performed as a system reflecting sound.

Figure 11:
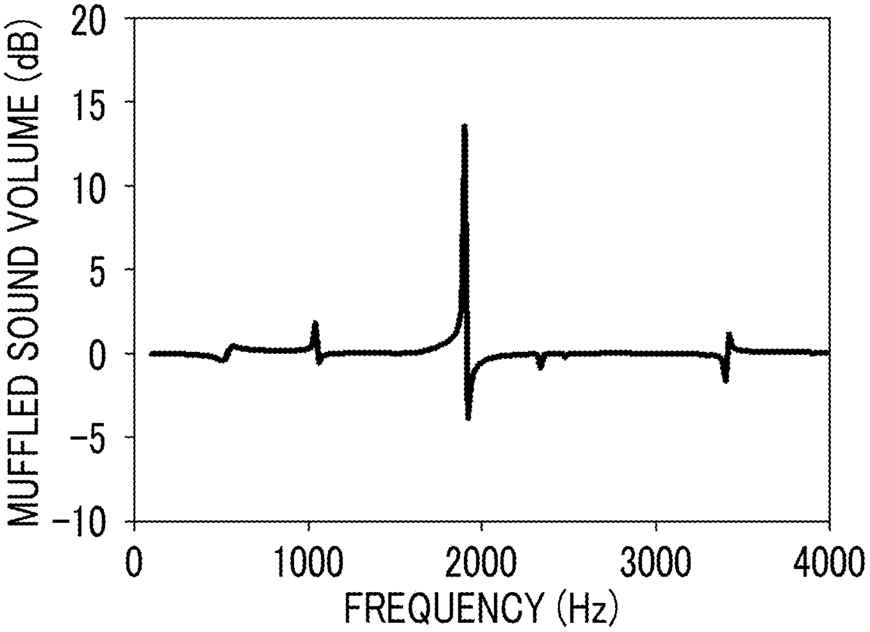
FIG. 11 is a graph showing muffled sound volume of the acoustic system, in which one membrane-type resonance structure showing the normal incidence sound absorption coefficient shown in FIG. 10 is disposed, in Simulation 1.
Figure 12:
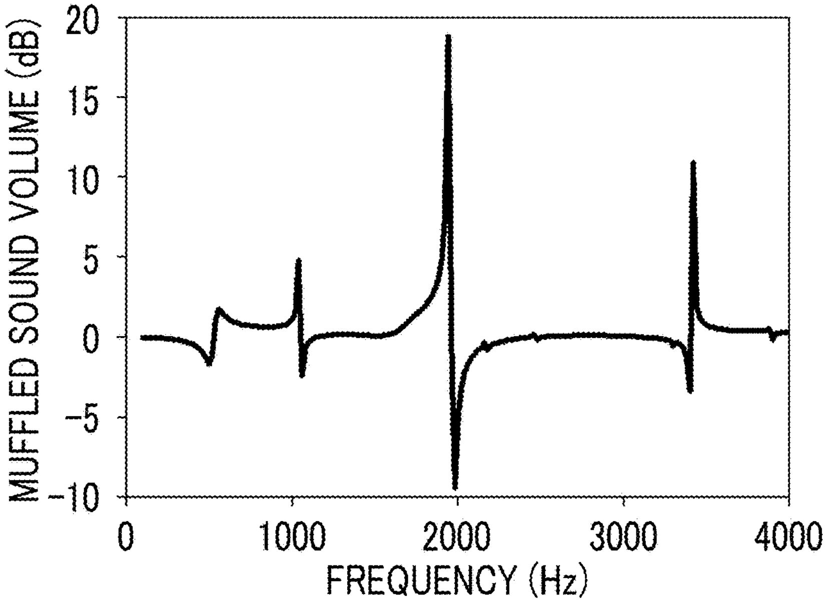
FIG. 12 is a graph showing muffled sound volume of the acoustic system, in which four membrane-type resonance structures showing the normal incidence sound absorption coefficient shown in FIG. 10 are disposed, in Simulation 1.

FIGS. 11 and 12 respectively show muffled sound volume in a case where one membrane-type resonance structure was disposed and muffled sound volume in a case where four membrane-type resonance structures were disposed. The muffled sound volume was calculated as a difference between externally radiating sound volume in a case where the membrane-type resonance structure was not disposed and externally radiating sound volume in a case where the membrane-type resonance structure was disposed. First, in order to see the ideal effect of the resonating body through calculation, a state where there was no sound absorption by a membrane structure was caused. This could be set as only the real part of the Young's modulus of the membrane had a number numerically and the imaginary part was set to 0. That is, although there was a change in a phase and/or a traveling direction of sound waves caused by resonance, calculation was performed under a condition that there was no sound absorption caused by resonance. Under either condition, radiating sound volume was small compared to a case where there was no membrane-type resonance structure, there was a portion where the muffled sound volume was significantly large, and a significantly large muffling effect appeared.

As shown in FIGS. 11 and 12, at 2 kHz, which showed the largest resonance effect, the largest muffling effect appeared. In addition, at approximately 1 kHz, which was another membrane vibration resonant frequency, and approximately 3.5 kHz as well, the muffling effect appeared. That is, in the present invention, a single device can perform muffling at a plurality of frequencies. This corresponds to the fact that the membrane-type resonance structure used in the present invention has a plurality of resonances caused by fundamental vibration and a plurality of higher-order vibrations.

In this manner, it was found out that muffling occurred greatly with respect to a specific frequency by disposing the membrane-type resonance structure on the wall 12*d* of the duct 12.

Figure 14A:
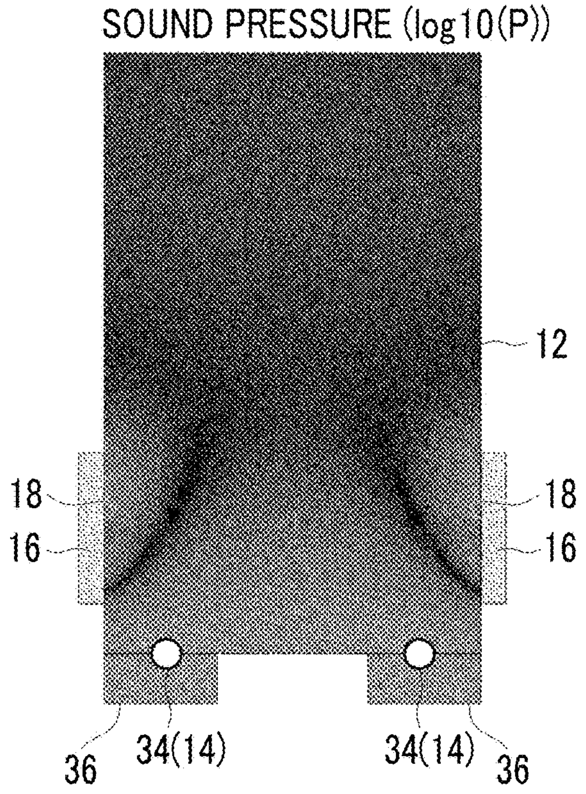
FIG. 14A is a view showing a sound pressure distribution in which a sound pressure amplitude inside the duct of the acoustic system in Simulation 1 is logarithmically shown in shades.
Figure 14B:
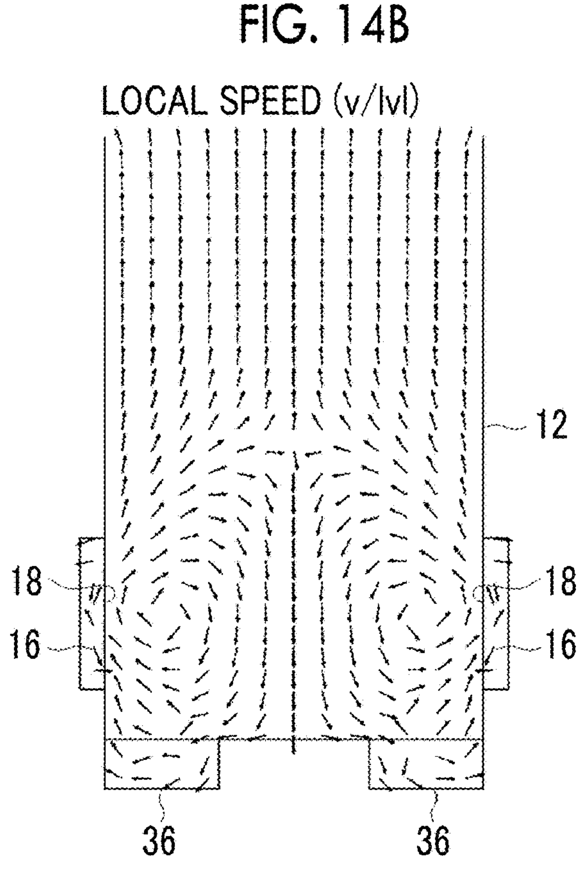
FIG. 14B is a diagram of a local speed distribution shown by arrows after normalizing a local speed inside the duct of the acoustic system in Simulation 1.

In order to clarify the mechanism, a sound pressure inside the duct 12 and a local speed were calculated. FIG. 14A shows a view of a sound pressure distribution (logarithmic expression as log 10(P)) in which the sound pressure amplitude is logarithmically shown in shades. FIG. 14B shows a diagram of a local speed distribution shown by arrows after normalizing a local speed. This is the result at 1.945 kHz where a large muffling effect was obtained. In FIG. 14A, white spots 34 indicate the sound sources 34 (enabled by the blades of the fan 14), white indicates that the sound pressure is high, and black and dark shades indicate that the sound pressure is low.

From the sound pressure distribution shown in FIG. 14A, it is found out that sound radiated from the internal sound source was propagated only to the vicinity of the membrane-type resonance structure and was confined inside the duct 12. In addition, there is a portion where the sound pressure was locally decreased between the vicinity of the membrane-type resonance structure and a middle portion of the duct 12. This indicates that the membrane-type resonance structure and sound in the vicinity of a center portion of the duct 12 canceled each other out by interference. From the local speed distribution shown in FIG. 14B as well, it is found out that the direction of the local speed was reversed in the vicinity of the membrane-type resonance structure, causing interference of canceling-out. Accordingly, the mechanism of muffling the sound radiated to the outside of the duct 12 as interference, in which sound of which a phase was changed by the resonance of the membrane-type resonance structure and directly radiating sound from the internal sound source canceled each other out, occurred was clarified.

That is, the interference of canceling-out occurred due to interaction among the membrane-type resonance structure, the sound source, and a sound source rear surface (the reflection wall, the shaft, and the like). In a case where a distance between the two is short, near-field interference occurs, and in a case where the distance between the two is long, interference occurs in propagating waves.

[Reference]

In Simulation 1, the reflection wall (reflection interface) 36 (refer to FIGS. 14A and 14B) was provided on the rear surface side (the open end 12*c* side) of the internal sound source (the fan 14 shown in FIG. 2). This was to simulate a phenomenon peculiar to the case of the fan 14. The causes of the occurrence of predominant sound at a specific frequency in the case of the fan 14 were the number of blades of the fan 14 and the continued radiation of sound at a frequency, which was a rotation speed, in phase. That is, the blades of the fan 14 were in a state of moving in synchronization with a predominant sound frequency. At this time, in a case where sound, which was reflected in the duct 12, returned to the portion of the blades of the fan 14, the blades moving in synchronization with the frequency rotated, so that a situation where the blades and the sound were likely to interact with each other was caused. In this case, as the interaction was large, reflection at the position of the fan 14 was likely to occur.

Accordingly, regarding a predominant sound frequency using the fan 14 as a noise source, even in a case where a space on the rear surface side of the fan 14 was physically opened, the movement of the blades caused sound to behave just as the high impedance reflection wall (reflection interface) 36 was formed regarding predominant sound. A model in which the reflection wall 36 was disposed on the rear surface side of the internal sound source was prepared with the intention of simulating a decrease by the predominant sound of the fan 14.

[Simulation 2]

Next, in order to confirm a relationship between the position of the membrane-type resonance structure, which is the membrane-type resonating body 16 of the acoustic system 10 according to the embodiment of the present invention, and muffled sound volume, a change in the muffled sound volume was calculated by changing the position of the membrane-type resonance structure under the same condition (a case of four membrane-type resonance structures) as Simulation 1. Muffled sound volume at 1.945 kHz, which was a resonant frequency, was calculated under each condition by changing a distance between the position of the internal sound source 34 and a lower end of the membrane-type resonance structure 16 from 5 mm to 85 mm. The results are shown in FIG. 15.

Figure 15:
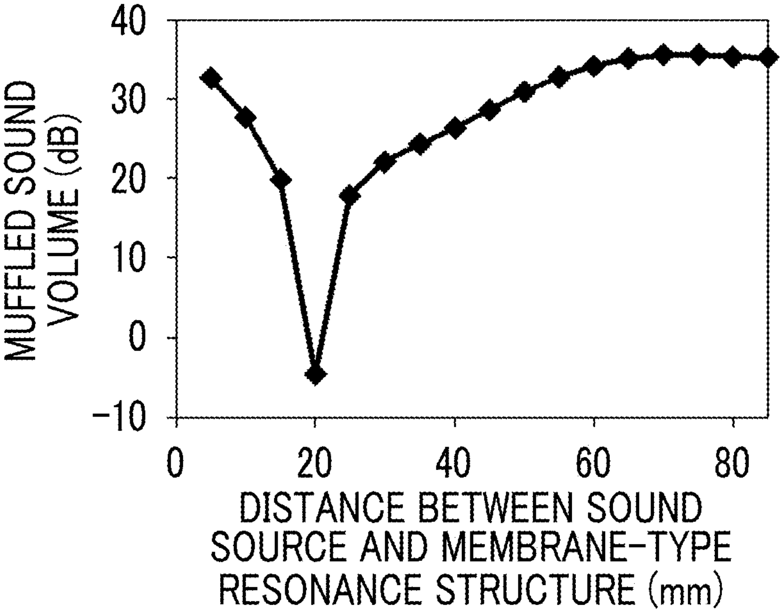
FIG. 15 is a graph showing a relationship between a position of the membrane-type resonance structure of the acoustic system and muffled sound volume in Simulation 2.

As shown in FIG. 15, the muffled sound volume changed depending on the position of the membrane-type resonance structure. In particular, in a case where a distance in the graph shown in FIG. 15 was 20 mm, that is, a distance between the internal sound source and the center of the membrane-shaped member 18 was 35 mm, and a distance between the reflection wall on the rear surface side of the internal sound source and the center of the membrane-shaped member 18 was 45 mm, it was found out that there was a condition where a muffling effect was hardly seen.

Figure 16:
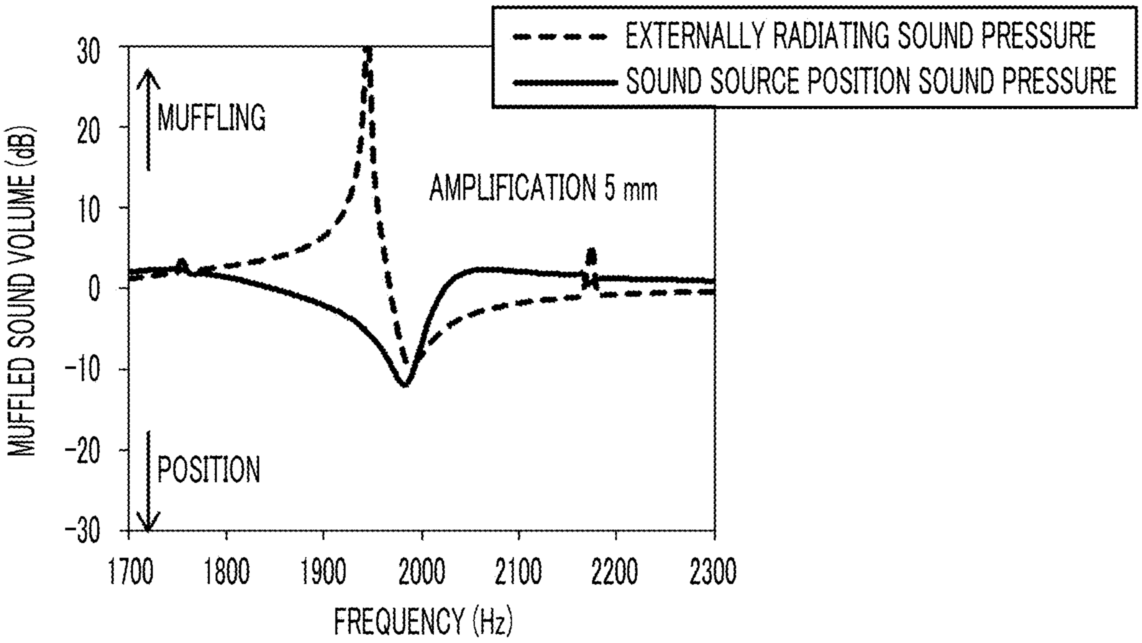
FIG. 16 is a graph showing muffled sound volume with respect to frequencies of an externally radiating sound pressure at one position of the membrane-type resonance structure of the acoustic system of Simulation 2 and a sound source position sound pressure.
Figure 18:
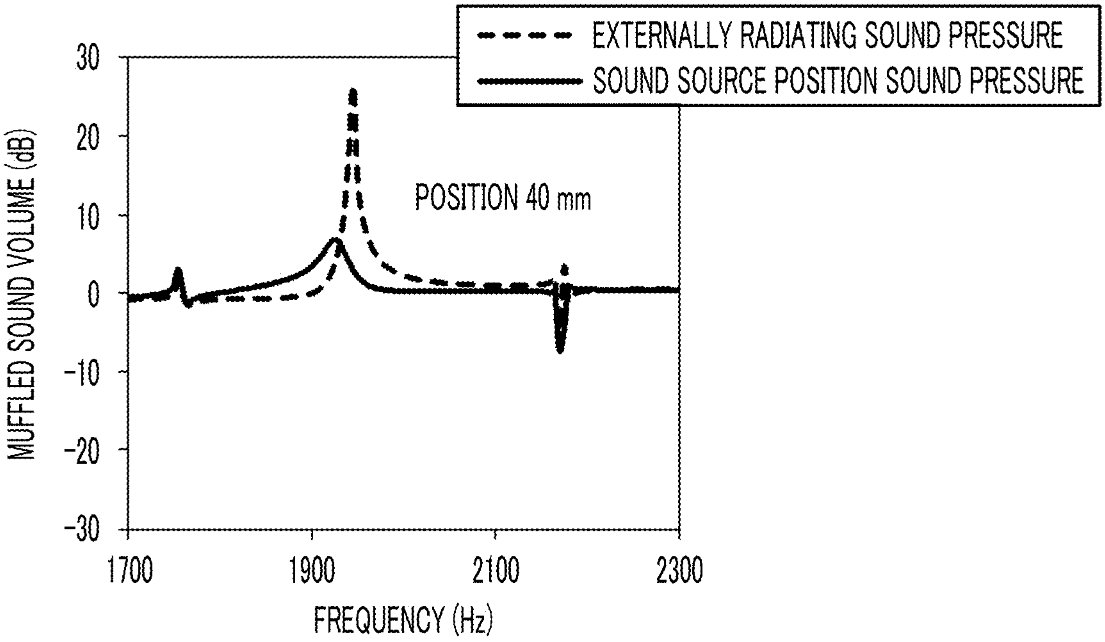
FIG. 18 is a graph showing muffled sound volume with respect to frequencies of the externally radiating sound pressure at still another position of the membrane-type resonance structure of the acoustic system of Simulation 2 and the sound source position sound pressure.
Figure 19:
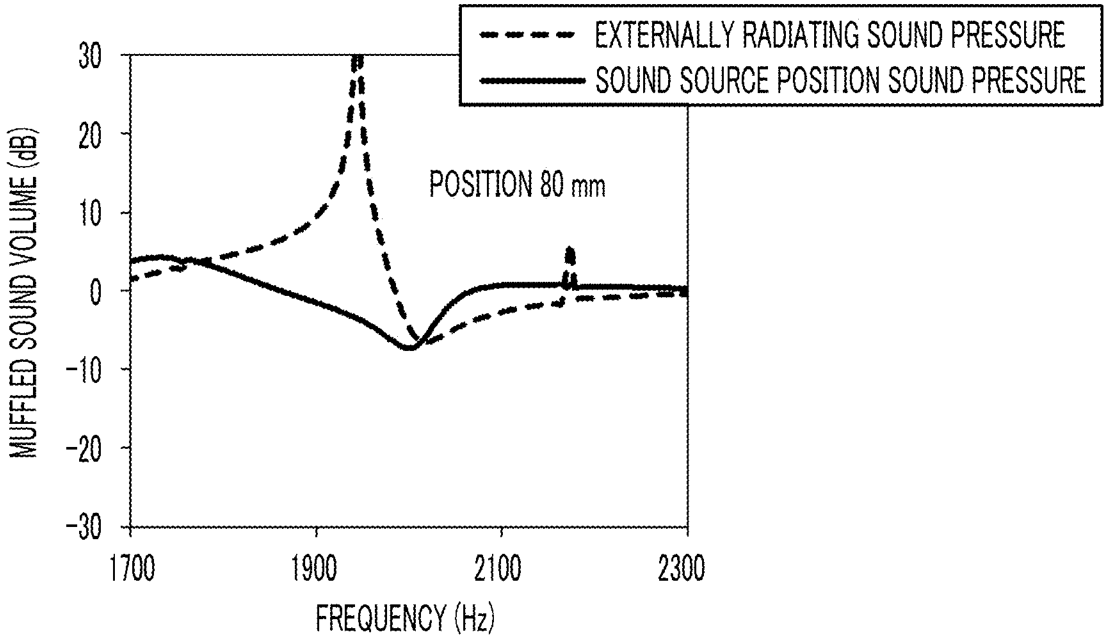
FIG. 19 is a graph showing muffled sound volume with respect to frequencies of the externally radiating sound pressure at still another position of the membrane-type resonance structure of the acoustic system of Simulation 2 and the sound source position sound pressure.

In order to clarify the mechanism of this phenomenon, the level of a sound pressure at the internal sound source position was calculated. It is known that as the sound pressure at the internal sound source position increases, the radiation amount of sound from the sound source increases. The muffled sound volume of externally radiating sound and muffled sound volume at an internal sound pressure position are shown in FIG. 16 in a case of the position of 5 mm (a near-field interference region), in FIG. 17 in a case of position of 20 mm (an extreme internal sound source position amplification region), in FIG. 18 in a case of 40 mm, and in FIG. 19 in a case of 80 mm. That is, an effect of placing the membrane-type resonance structure was expressed as a difference with a condition without the membrane-type resonance structure as reference.

Figure 17:
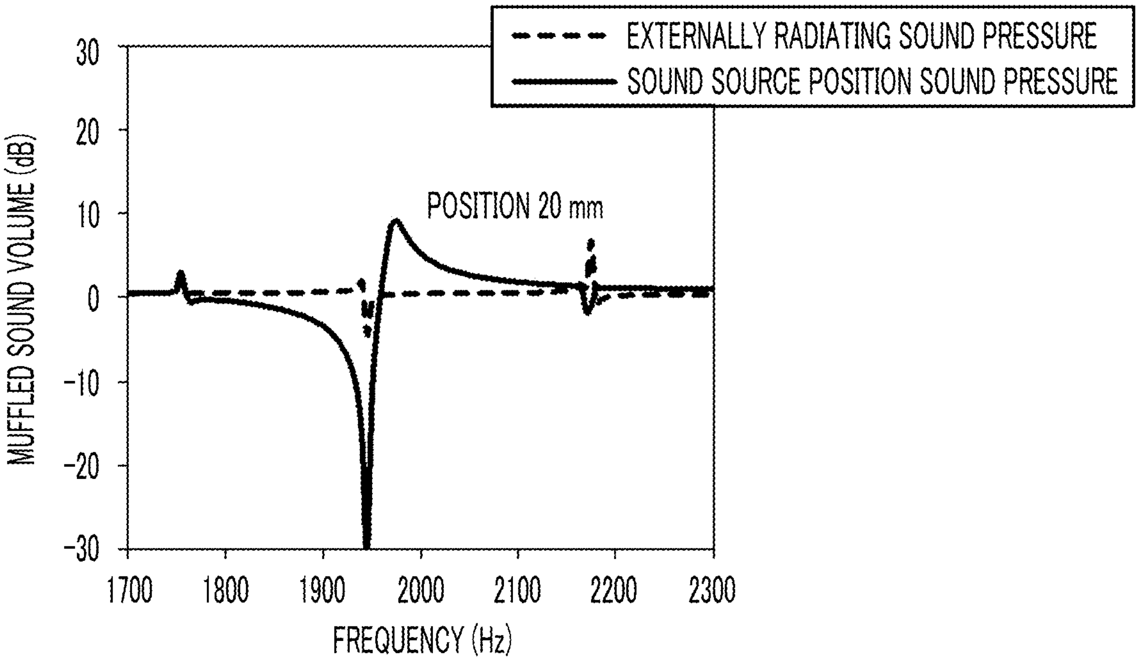
FIG. 17 is a graph showing muffled sound volume with respect to frequencies of the externally radiating sound pressure at another position of the membrane-type resonance structure of the acoustic system of Simulation 2 and the sound source position sound pressure.

FIG. 17 shows a condition where externally radiating sound was hardly muffled. In this case, at a resonant frequency of the membrane structure, the amplification (a minus direction in FIG. 17) of an extremely large sound pressure occurred at the position of the internal sound source. For this reason, it was found out that sound radiated from the sound source was strongly (30 dB or more) amplified, offsetting the muffling effect of the externally radiating sound by the membrane-type resonance structure. Consequently, the muffling effect disappeared.

On the other hand, at other positions (FIGS. 16, 18, and 19), the sound pressure at the internal sound source position at the resonant frequency of the membrane-type resonance structure was not greatly amplified. Accordingly, it is regarded that the externally radiating sound was muffled without offsetting the muffling effect by the membrane-type resonance structure. In particular, in the case of FIG. 8A, there is almost no frequency at which the externally radiating sound is amplified near the resonance, and there is a characteristic that a muffling effect is obtained over the entire region. At this time, it is found out that there is almost no frequency at which the internal sound source position is amplified.

In this manner, it was found out that externally radiating sound volume was determined by both of the resonance characteristic of the membrane-type resonance structure itself and a change in a sound pressure radiating amount caused by an increase or a decrease in the sound pressure at the internal sound source position.

The case of the position of 20 mm shown in FIG. 17 will be further considered. In this case, a distance between the reflection wall 36 on the rear surface side of the sound source 34 and the middle position of the membrane-shaped member 18 in the duct flow passage direction was 45 mm.

The membrane-type resonance structure also exhibited reflection since a phase change occurred at a resonant frequency. Sound reflected by the membrane-type resonance structure was again reflected by the reflection wall 36 behind the sound source, and returned to the position of the membrane-type resonance structure. Further, the sound was reflected again at the position of the membrane-type resonance structure. In a case where sounds reflected by the membrane-type resonance structure are in phase with each other, the reflections overlap each other, causing strong resonance. That is, a resonator for sound caused by the position of the membrane-type resonance structure 16 in the duct 12 and the position of the reflection wall 36 behind the sound source is formed.

Being an antinode of a sound pressure due to an interface from low impedance to high impedance at the position of the reflection wall 36 behind the sound source 34, and non-reversal of the phase of reflected waves of the sound pressure, that is, the phase change of the sound pressure was 0. At a membrane-type resonance position, there was a node of the sound pressure due to the characteristic of the resonance. Accordingly, the reversal of the phase of the reflected waves of the sound pressure, that is, the phase change of the sound pressure was $\lambda/2$. At this time, insofar as a distance between the position of the reflection wall 36 of the rear surface of the sound source 34 and the position of the membrane-type resonance structure 16 was $\lambda/4$, a phase difference between the reflected waves at the position of the membrane-type resonance structure was $\lambda$ (the phase change $\lambda/2$ caused by reciprocating+the phase change $\lambda/2$ at a resonator), showing a relationship of amplifying overlap. That is, it is found out that a condition where a strong resonator was formed by the membrane-type resonance structure 16 and the reflection wall 36, which was the sound source rear surface, when the distance of $\lambda/4$ was satisfied.

$\lambda/4$ at a wavelength of 2 kHz was approximately 43 mm. In a case of the condition of FIG. 17, since the condition is a condition where a distance between the reflection wall 36, which was the sound source rear surface, and the membrane-type resonance structure 16 was 45 mm, a resonator that was extremely close to the resonance condition and was strong in the duct was formed. At this time, a sound pressure in the duct centered around the inside of the resonator was extremely greatly amplified due to a resonance phenomenon. Since there was the internal sound source in the resonator in this simulation disposition, also the sound pressure at the internal sound source position was amplified. It was found out that as the sound pressure of the internal sound source was increased by the resonator in this manner, radiating sound volume from the sound source increased, causing an effect of offsetting a muffling effect by the membrane-type resonance structure.

[Simulation 3]

Figure 20:
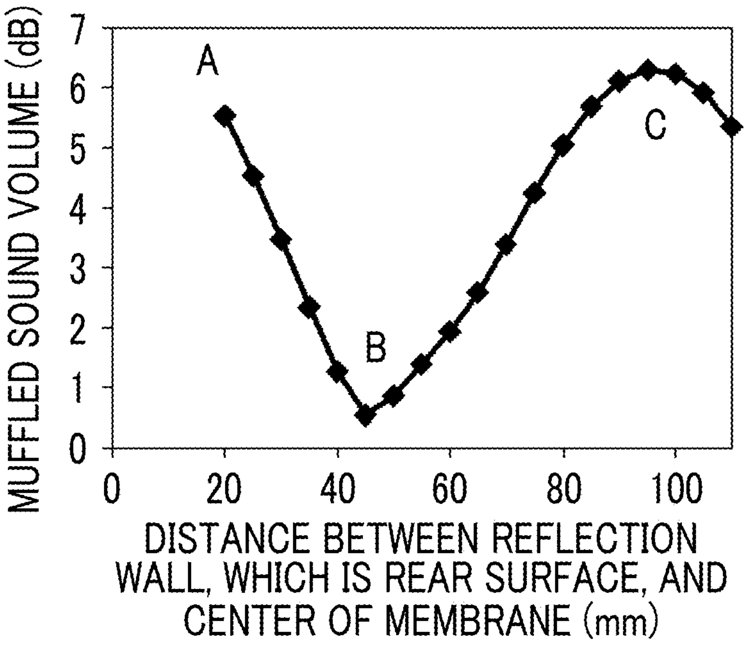
FIG. 20 is a graph showing a relationship between a distance between a membrane center position of the membrane-type resonance structure of the acoustic system and a reflection wall, which is a sound source rear surface, and muffled sound volume of the membrane-type resonance structure, in Simulation 3.

Next, in order to confirm an effect of the membrane-type resonance structure, which was the membrane-type resonating body 16 of the acoustic system 10 according to the embodiment of the present invention as a practical system, calculation, in which a distance between the sound source 34 and the reflection wall 36, which was a rear surface, was set to 10 mm and also sound absorption was added to the membrane-type resonance structure, was performed. That is, with the same structure as in Simulation 2, a structure where an imaginary part was introduced into the Young's modulus of the membrane structure and the membrane-shaped member 18, which was the practical system, absorbed sound was adopted. Muffled sound volume in a case where the position of the membrane-type resonance structure was changed was calculated. The results are shown in FIG. 20. In the drawing, the horizontal axis represents a distance between the position of the center of the membrane-shaped member 18 and the reflection wall 36, which is the sound source rear surface.

Figure 21:
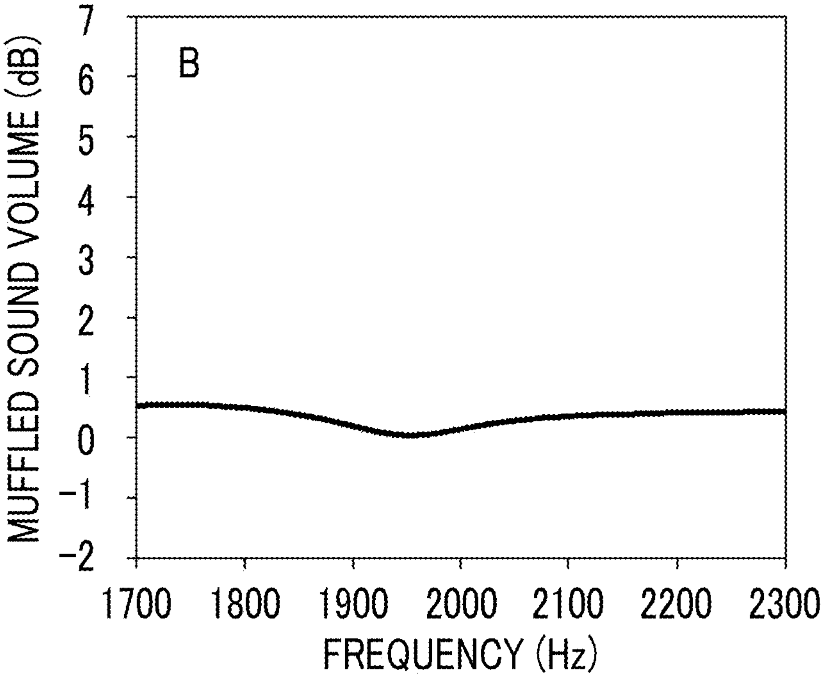
FIG. 21 is a graph showing muffled sound volume with respect to a frequency of the membrane-type resonance structure at a distance shown by a point B of FIG. 20.

As compared to FIG. 15, it is found out that even in a case where there was sound absorption by the membrane-shaped member 18, similarly, the muffled sound volume was changed by the position of the membrane-type resonance structure. The muffled sound volume was smallest in a case where the distance was 45 mm, and this point matched the examination results in Simulation 2. That is, when a distance between the reflection interface (36), which was the rear surface, and the center of the membrane-type resonance structure 16 was the length of the resonator, which was λ/4, the muffled sound volume was smallest due to the internal amplification. FIG. 21 shows a muffled sound volume spectrum in this case (a point B of FIG. 20). It is found out that externally radiating sound was barely muffled.

Figure 22:
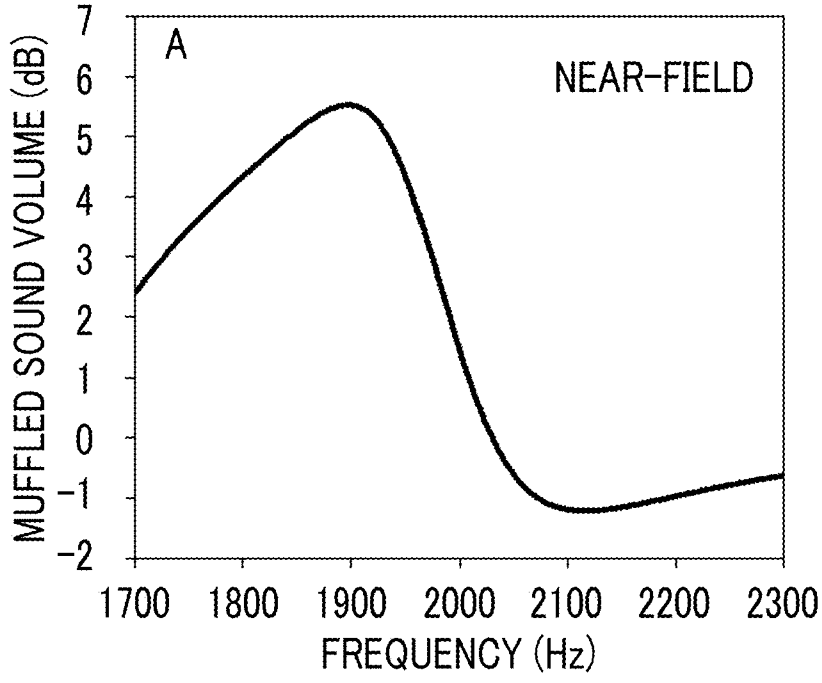
FIG. 22 is a graph showing muffled sound volume with respect to a frequency of the membrane-type resonance structure at a distance shown by a point A of FIG. 20.
Figure 23:
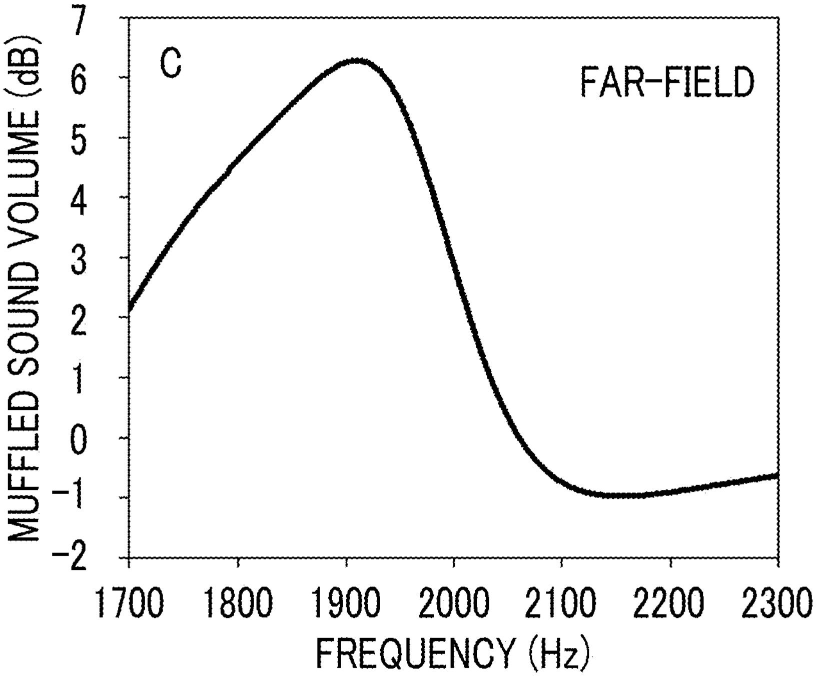
FIG. 23 is a graph showing muffled sound volume with respect to a frequency of the membrane-type resonance structure at a distance shown by a point C of FIG. 20.

On the other hand, in a case of a distance of 20 mm, at which the reflection wall 36, which was the sound source rear surface, and the sound source 34 were brought closer to the membrane-shaped member 18 (FIG. 22; a point A of FIG. 20: near-field), and a case of a distance of 95 mm, at which the reflection wall 36, which was the sound source rear surface, and the sound source 34 were brought further away from the membrane-shaped member 18 (FIG. 23; a point C of FIG. 20: far-field), a large muffling effect exceeding 5 dB was obtained. That is, it became clear that the muffled sound volume increased in a case where it was avoided that the distance became λ/4, and the muffled sound volume was maximum in a case of approximately m*λ/2 (m was an integer of 0 or more). When this condition was satisfied, reflected waves of the membrane-type resonance structure had a phase relationship of not overlapping each other, which was a condition where a resonator was most unlikely to be formed in the duct 12. For this reason, without amplifying a sound pressure at the sound source position, the largest muffling effect by the membrane-type resonance structure was obtained.

In particular, muffling approximately at m=0 showed that the muffling effect was obtained even in a case of disposing in a near-field region less than λ/4, and showed that disposition was possible even in a case where the length of the duct 12 was extremely small, which is practically important.

[Simulation 4]

Next, in order to confirm an effect of the membrane-type resonance structure, which was the membrane-type resonating body 16 of the acoustic system 10 according to the embodiment of the present invention as the practical system as in Simulation 3, calculation, in which a distance between the sound source 34 and the reflection wall 36, which was the rear surface, was set to 20 mm and also sound absorption was added to the membrane-type resonance structure, was performed.

Figure 24:
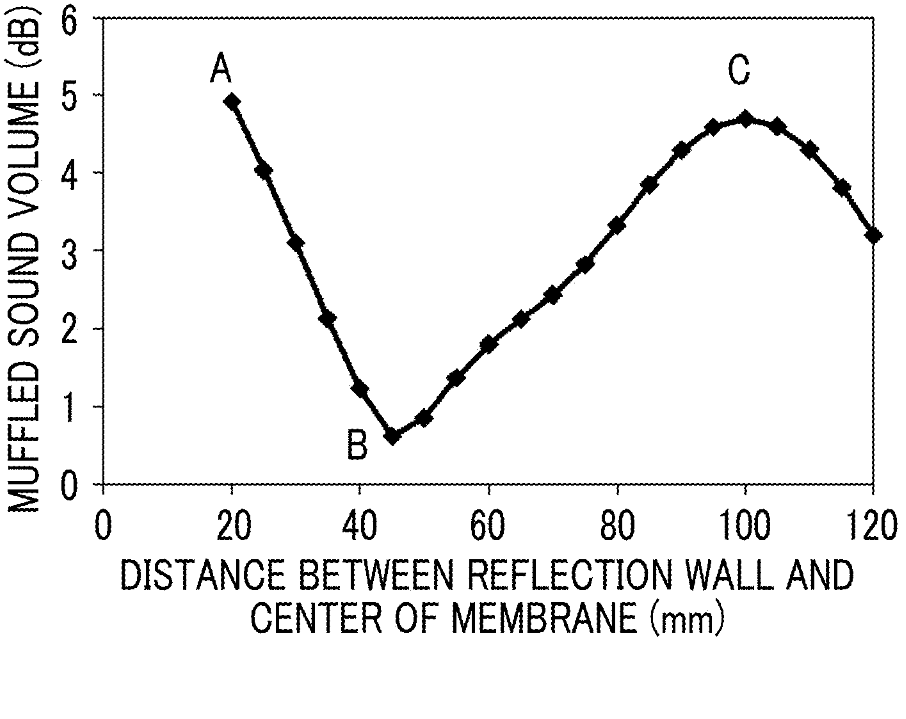
FIG. 24 is a graph showing a relationship between a distance between the membrane center position of the membrane-type resonance structure of the acoustic system and the reflection wall, which is the sound source rear surface, and muffled sound volume of the membrane-type resonance structure, in Simulation 4.
Figure 25:
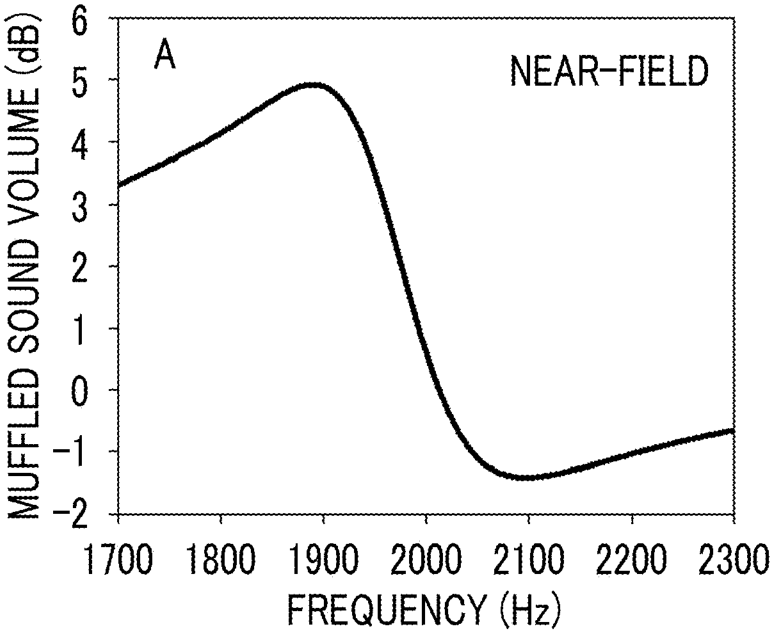
FIG. 25 is a graph showing muffled sound volume with respect to a frequency of the membrane-type resonance structure at a distance shown by a point A of FIG. 24.
Figure 26:
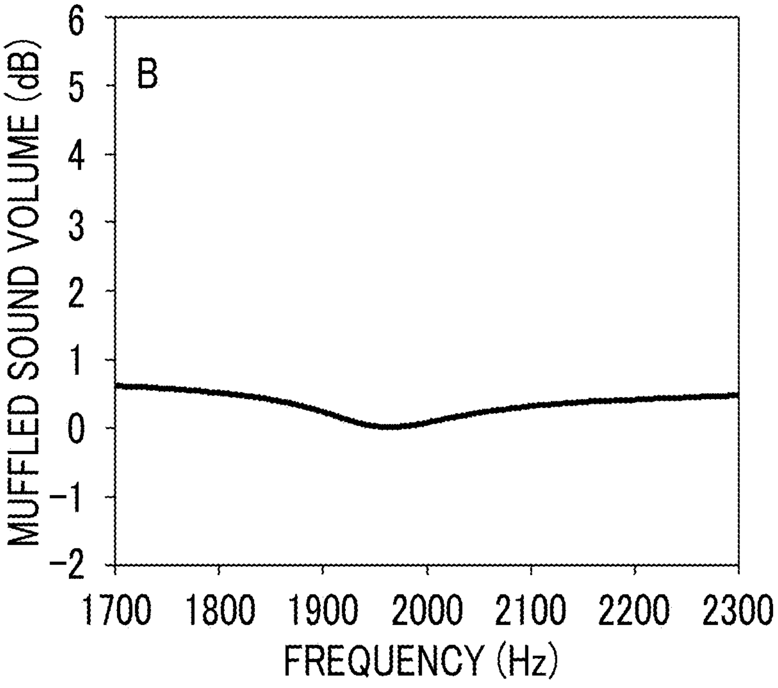
FIG. 26 is a graph showing muffled sound volume with respect to a frequency of the membrane-type resonance structure at a distance shown by a point B of FIG. 24.
Figure 27:
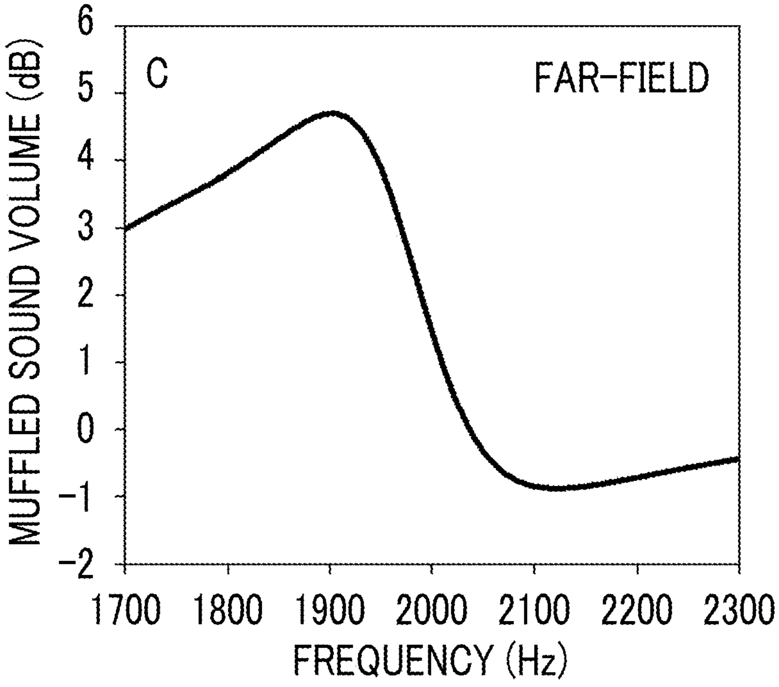
FIG. 27 is a graph showing muffled sound volume with respect to a frequency of the membrane-type resonance structure at a distance shown by a point C of FIG. 24.

Compared to Simulation 3, the distance between the sound source 34 and the reflection wall 36, which was the rear surface, was set to 20 mm, instead of 10 mm. FIG. 24 shows a change in the muffled sound volume in a case where the position of the membrane-type resonance structure was changed. It was found out that even in a case where a distance from the sound source to the reflection wall, which was the rear surface, was changed, as in Simulation 3, the muffling effect was smallest when a distance between the reflection wall and the membrane-type resonance structure was λ/4, and the muffling effect increased on both sides thereof. FIGS. 25 to 27 each show a muffling spectrum at a position thereof. It is found out that even in a case where the membrane-type resonance structure was disposed right next to the point sound source shown in FIG. 25 (the point A of FIG. 24), that is, a case of m=0, the large muffling effect appeared. A duct length was not necessary at this position in principle, leading to the fact that muffling was possible with the approximate size of the casing of the fan 14, which is practically important.

In this manner, it became clear that in a case where there was a high impedance interface (the point B of FIG. 24), which was a wall, on the rear surface, and a case where a distance between the rear surface wall of the sound source and the membrane-type resonance structure was λ/4 as shown in FIG. 26, a resonator was formed and the muffling effect decreased, and on the other hand, as shown in FIGS. 25 and 27, in a case of m×λ/2 (the point A and the point C of FIG. 24), the muffling effect increased.

[Simulation 5]

Next, in order to confirm an effect of the membrane-type resonance structure, which was the membrane-type resonating body 16 of the acoustic system 10 according to the embodiment of the present invention, calculation, in which the reflection wall 36, which is the rear surface of the sound source 34, was eliminated and also sound absorption was added to the membrane-type resonance structure, was performed.

Figure 28:
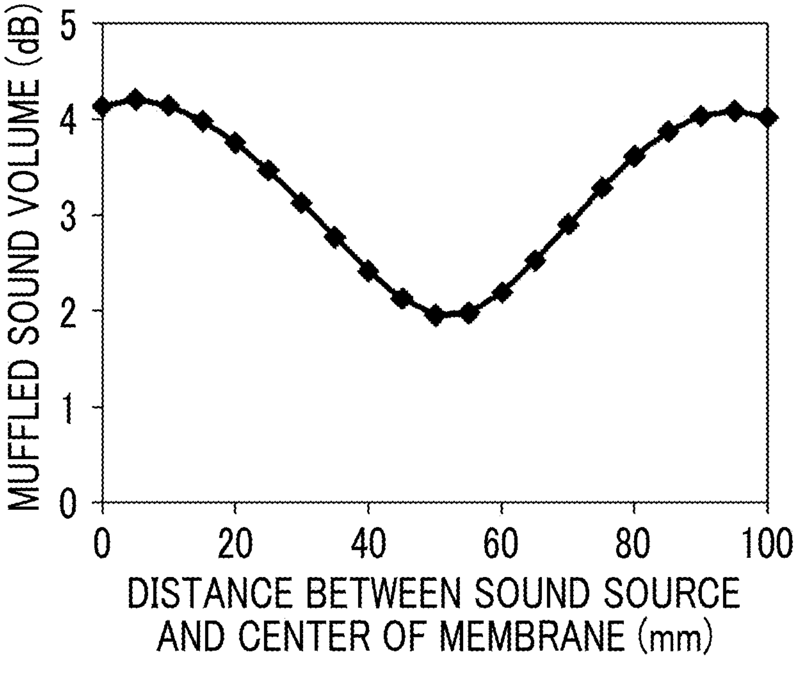
FIG. 28 is a graph showing a relationship between a distance between the membrane center position of the membrane-type resonance structure of the acoustic system and a sound source position, and muffled sound volume of the membrane-type resonance structure, in Simulation 5.

A change was made into the same system as in Simulation 4, in which the reflection wall 36, which was the rear surface of the sound source 34, was eliminated and sound was radiated to the outside, and the same calculation was performed. FIG. 28 shows a change in the muffled sound volume when the position of the membrane-type resonance structure was changed as in Simulation 4 in this case. The distance was set to a distance between the position of the sound source 34 and the center position of the membrane-type resonance structure 16. Even in a case where the rear surface side of the sound source was opened, the muffled sound volume changed at the position of the membrane-type resonance structure. In a case where the distance between the sound source position and the position of a middle portion of the membrane 18 was approximately λ/4, the muffled sound volume was smallest. In addition, the muffled sound volume maximized when at the position of approximately m×λ/2.

Figure 29:
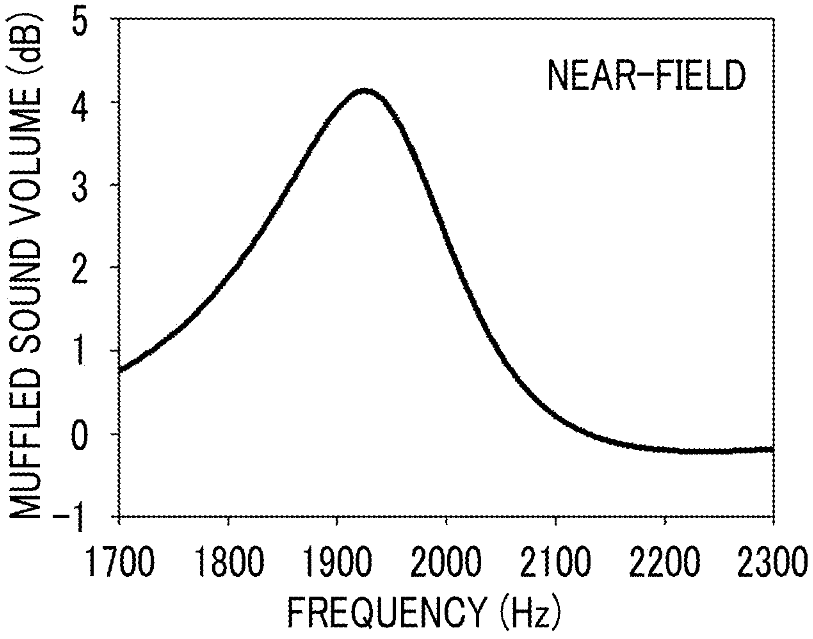
FIG. 29 is a graph showing muffled sound volume with respect to a frequency of the membrane-type resonance structure at one position of the membrane-type resonance structure of the acoustic system of Simulation 5.

Even in a case where the rear surface of the internal sound source was opened, the duct was narrowed at the internal sound source position since there was the axial portion as the reflection wall. Thus, the sound source position became the high impedance interface. Accordingly, it was found out that the position dependence of the muffled sound volume greatly appeared due to the presence of the high impedance interface even in a case where the reflection wall was not perfect as calculated in Simulations 3 and 4. FIG. 29 (distance of 0 mm: the near-field at the position right next to the sound source), FIG. 30 (distance of 50 mm), and FIG. 31 (distance of 100 mm) each show a muffling spectrum.

Figure 30:
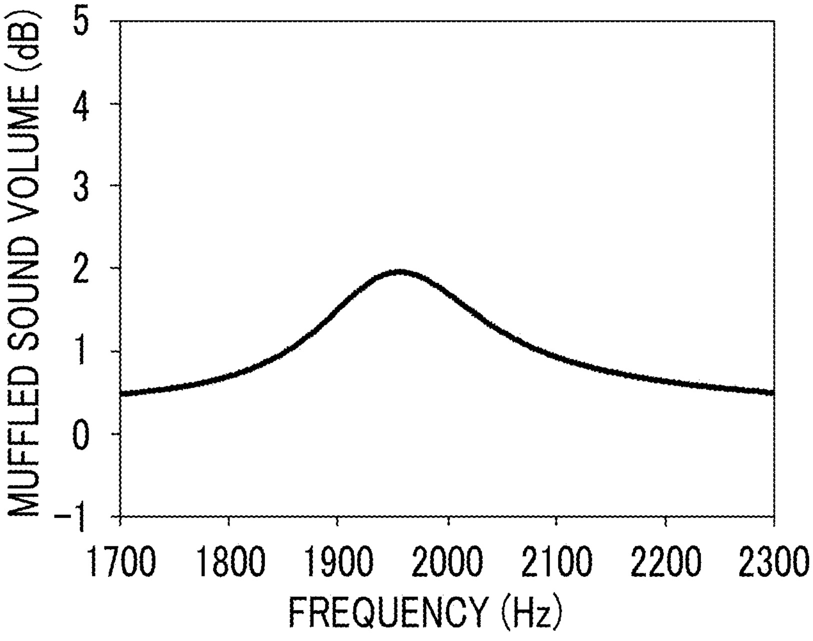
FIG. 30 is a graph showing muffled sound volume with respect to a frequency of the membrane-type resonance structure at another position of the membrane-type resonance structure of the acoustic system of Simulation 5.
Figure 31:
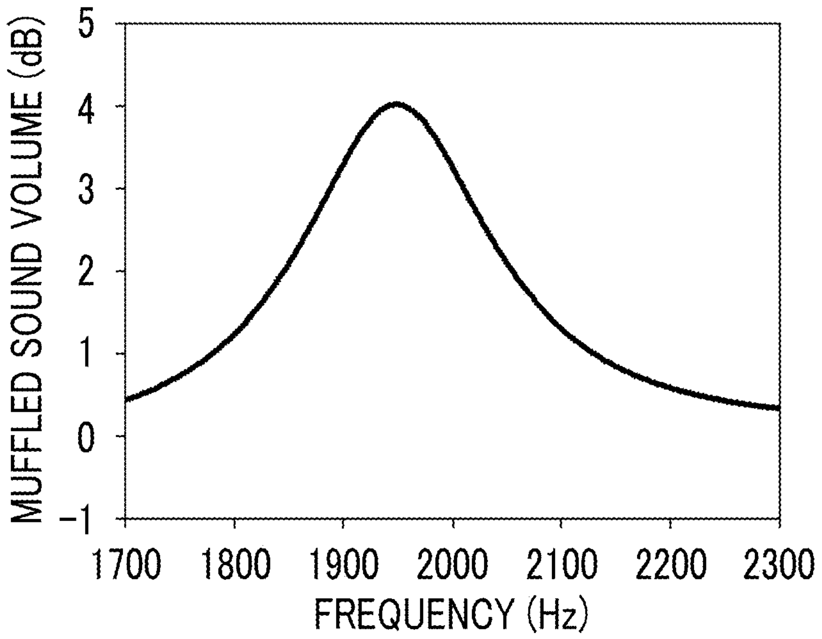
FIG. 31 is a graph showing muffled sound volume with respect to a frequency of the membrane-type resonance structure at still another position of the membrane-type resonance structure of the acoustic system of Simulation 5.

In this manner, it was found out that even in a case where there was no reflection wall, which was the rear surface of the sound source, the interface to the high impedance side occurred depending on the shape of the sound source itself, so that an optimum position of the membrane-type resonance structure appeared. In particular, as shown in FIG. 29, in the case of m=0 (distance of 0 mm), the muffling effect was obtained only by disposing the membrane-type resonance structure right next to the sound source, which is meaningful in size reduction. As shown in FIG. 30, in a case where the distance was 50 mm, which was close to λ/4, the muffled sound volume decreased. As shown in FIG. 31, it is found out that the muffled sound volume maximized in a case where the distance was 100 mm, which was close to λ/2.

As in the cases of Simulations 1 to 4, in a system having the internal sound source 34, the reflection wall 36, and the membrane-type resonating body 16, there is a mechanism in which there are two resonances and the resonances contribute to muffling and amplification, respectively. The mechanisms were considered.

A muffling mechanism (the membrane-type resonating body alone) is as follows.

Figure 32:
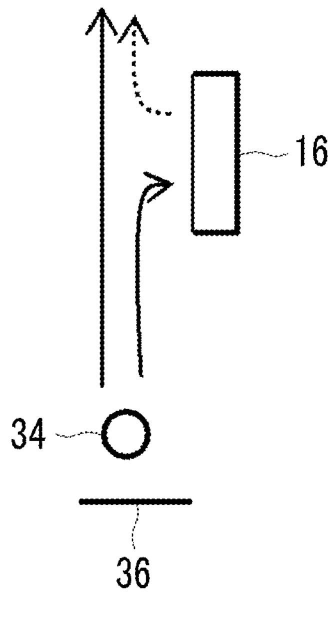
FIG. 32 is an explanatory view for describing a muffling mechanism in the acoustic system.

As shown in FIG. 32, sound (solid line) directly emitted from the sound source 34 and sound (dotted line), of which a phase was changed by the membrane-type resonating body 16 and which was discharged again, underwent phase reversal, causing interference of canceling each other out. Herein, phase reversal was performed depending on the characteristic of the membrane-type resonating body 16 regardless of a distance between the sound source 34 and the membrane-type resonating body 16. For this reason, a frequency was determined by the membrane-type resonating body 16 alone. Therefore, the phase change of transmitted waves caused by the resonance of the membrane-type resonating body 16 alone was important.

An amplifying mechanism (resonator depending on a length) is as follows.

Figure 33:
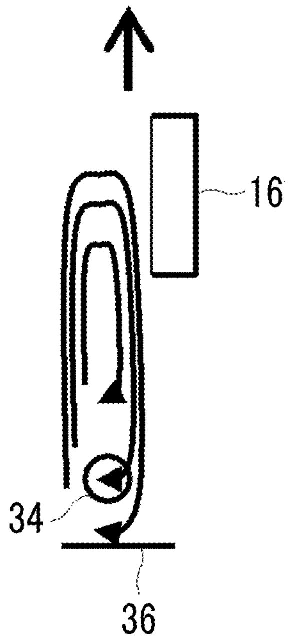
FIG. 33 is an explanatory view for describing an amplifying mechanism in the acoustic system.

As shown in FIG. 33, in a case where a distance between the membrane-type resonating body 16 and the reflection wall 36 behind the sound source agreed with a wavelength, the resonator caused resonance.

At this time, the length of a cavity was one fourth (λ/4) of the wavelength. Herein, sound from the sound source 34 was strongly radiated by increasing a sound pressure at the position of an internal sound source 34. For this reason, the externally radiating sound also increased. This was based on the resonance characteristic of the cavity formed by the reflection wall 36 and the membrane-type resonating body 16. Therefore, when a distance between the reflection wall 36 and the membrane-type resonating body 16 was λ/4, a resonance effect was large. For this reason, a distance between the reflection phase of the membrane-type resonating body 16 and the reflection wall 36, which was the rear surface, was important.

Both of the muffling mechanism and the amplifying mechanism worked at a frequency near the resonance of the membrane-type resonating body 16.

In addition, a practical case where there was sound absorption by the membrane-type resonating body 16 of Simulations 3 and 4 absorbing sound through membrane vibration and an ideal case where there was no sound absorption by the membrane-type resonating body 16 of Simulations 1 and 2 were considered.

As described above, in case where sound was absorbed by the membrane-type resonating body 16 through membrane vibration, an imaginary part was introduced into the Young's modulus of the membrane 18, and calculation was performed assuming that the membrane 18 which actually performed absorption. In this case, a relationship between a distance between the reflection wall 36, which was the rear surface, and the center of the membrane 18 and the muffled sound volume was as shown in FIG. 20 described above.

Figure 34:
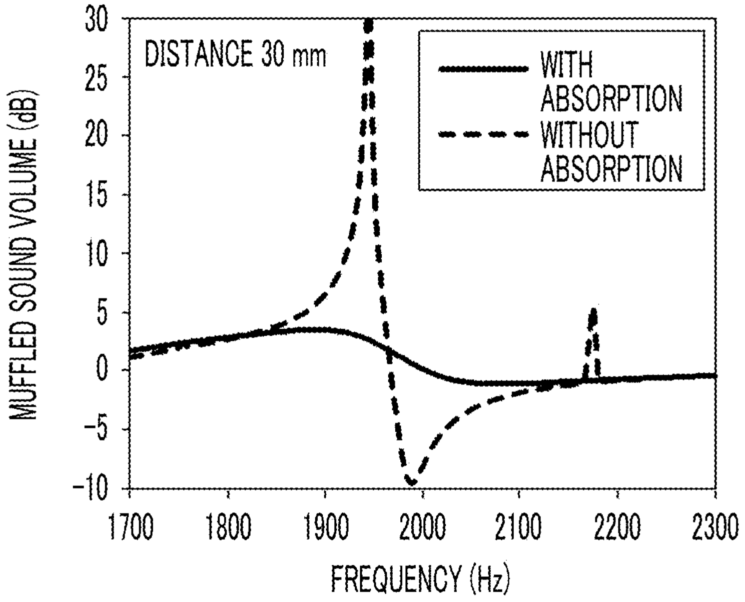
FIG. 34 is a graph showing muffled sound volume with respect to a frequency of the membrane-type resonance structure depending on the presence or absence of sound absorption of a membrane-type resonating body at one position of the membrane-type resonance structure of the acoustic system.
Figure 35:
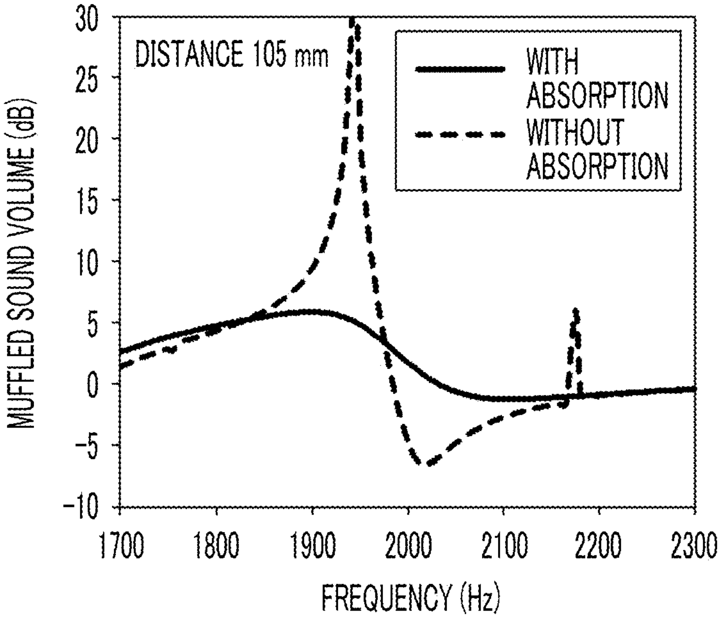
FIG. 35 is a graph showing muffled sound volume with respect to a frequency of the membrane-type resonance structure depending on the presence or absence of sound absorption of the membrane-type resonating body at another position of the membrane-type resonance structure of the acoustic system.

FIGS. 34 and 35 show, in a case where the distance between the reflection wall 36, which was the rear surface, and the center of the membrane 18 was 30 mm, and a case where the distance was 105 mm, a relationship between a frequency and muffled sound volume for a case where there was sound absorption by the membrane-type resonating body 16 and a case where there was no sound absorption.

As shown in FIG. 34 and FIG. 35, in a case where there was strong damping and sound absorption in the membrane 18, as shown by a solid line, there was no muffling, no amplification, and no strong peak shown by a dotted line showing a case where there was no sound absorption. As a result, the relationships were broadened as shown by the solid lines in FIGS. 34 and 35. However, the maximum and minimum positions of the muffled sound volume are not different from the case of the dotted lines showing no absorption.

The above simulation results can be summarized as follows.

In response to the resonance of the membrane-type resonating body with the rear surface closed space, a muffling effect appears. In a case where there is the higher-order vibration, the muffling effect appears in both of the fundamental vibration and the higher-order vibration.

On the other hand, there is a condition where a cavity resonator is formed by the membrane-type resonating body and the reflection wall, which is the rear surface, contributing to amplification.

Accordingly, muffling by the resonator (membrane-type resonating body) and amplification by the cavity resonator compete against each other, and the position dependence of the resonator appears.

Practically, in a case where a distance between the reflection wall and the membrane-type resonating body is λ/4, the cavity resonator is formed, the amplifying effect of the sound pressure is strong, and the muffling effect is small. Therefore, the membrane-type resonating body is to be disposed avoiding this distance of λ/4.

A large muffling effect appears even with the near-field interference by bringing the membrane-type resonating body closer to the sound source and/or the wall. In this case, muffling can be performed with an extremely small size.

As described above, through the simulations, it has been clarified that muffling can be performed for the predominant sound of the sound source by configuring an acoustic unit in which the membrane-type resonating body is disposed on the wall of the duct.

EXAMPLES

Hereinafter, the acoustic unit according to the embodiment of the present invention will be described in detail based on examples. Materials, amounts used, ratios, the content of processing, processing procedures, and the like shown in the examples below can be changed as appropriate without departing from the spirit of the present invention. Therefore, the scope of the present invention is not to be construed as limiting by the examples shown below.

Example 1

Figure 37:
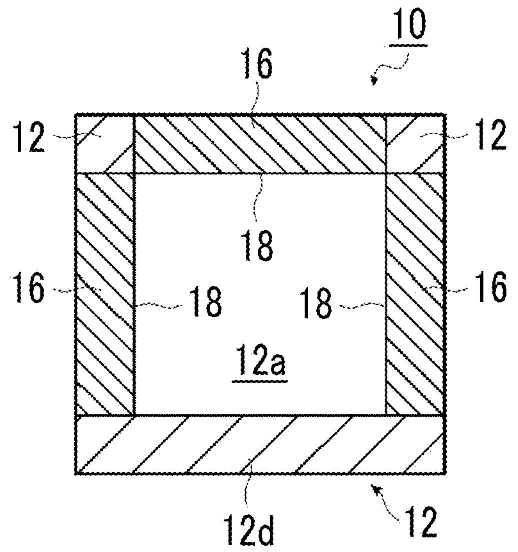
FIG. 37 is a cross sectional view showing disposition of three membrane-type resonating bodies of the acoustic unit of the experimental system shown in FIG. 36.
Figure 38:
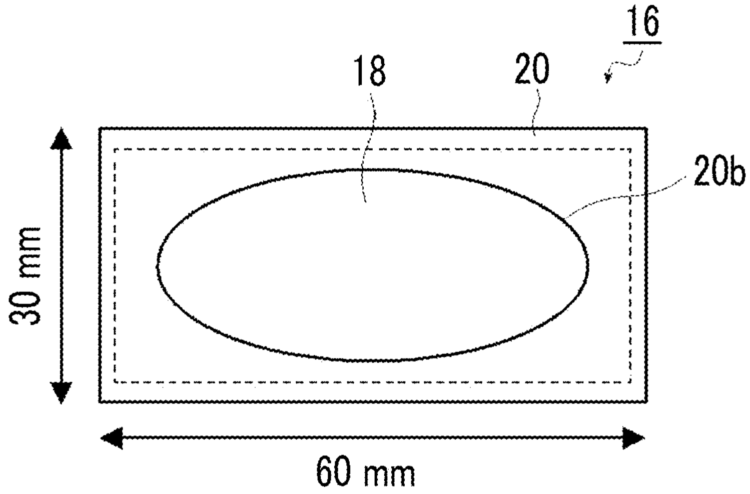
FIG. 38 is a top view showing a membrane-shaped member side surface of the membrane-type resonating body of the acoustic unit of the experimental system shown in FIG. 36.

First, as shown in FIGS. 37 and 38, one end surface of the duct 12 having cross section disposition shown in FIG. 37 was configured by fitting the membrane-type resonating body 16 having width 30 mm×length 60 mm×thickness 10 mm, which is shown in FIG. 38, into each of an upper surface, which was one end surface, and both side surfaces of the duct 12 that had the through-hole 12*a* having a square cross section of 60 mm×60 mm, had external dimensions of 80 mm×80 mm consisting of the wall 12*d* having a thickness of 10 mm, and had a length of 145 mm. Next, the fan 14, which had a square shape of 60 mm×60 mm and had a thickness of 28 mm, was attached to the one end surface of the duct 12 configured as described above, and the through-hole 12*a* of the duct 12 was configured to be covered with the fan 14, configuring the acoustic unit 10.

A duct 13 that had a through-hole 13*a* having the same dimensions, had cross section dimensions of 200 mm×60 mm×length 60 mm, and was lined with urethane rubber 13*b* having a thickness of 10 mm was attached to an intake side of the fan 14.

In addition, a microphone 38 was attached at a position separated at a right angle by 140 mm from a position 200 mm downstream from the center of the other open end 12*b* of the duct 12 on the left in the drawing of the acoustic unit 10, configuring an experimental system measuring the noise of the acoustic unit 10.

San Ace 60, Model: 9GA0612P1J03 (manufactured by Sanyo Denki) was used as the fan 14.

As shown in FIG. 38, the membrane-type resonating body 16 had the opening portion 20*b* that had an elliptical shape having a major axis of 5.6 mm and a minor axis of 2.6 mm. The rectangular parallelepiped frame 20, of which a bottom surface and four side surfaces were configured by using an upper acrylic plate having width 30 mm×length 60 mm×thickness 2 mm and an acrylic plate having a thickness of 2 mm, and which had width 30 mm×length 60 mm×width 10 mm as a whole, was configured. The membrane-shaped member 18 made of polyethylene terephthalate (PET) having a thickness of 125 μm was bonded to an upper surface of the upper acrylic plate to cover the opening portion 20*b*.

Figure 36:
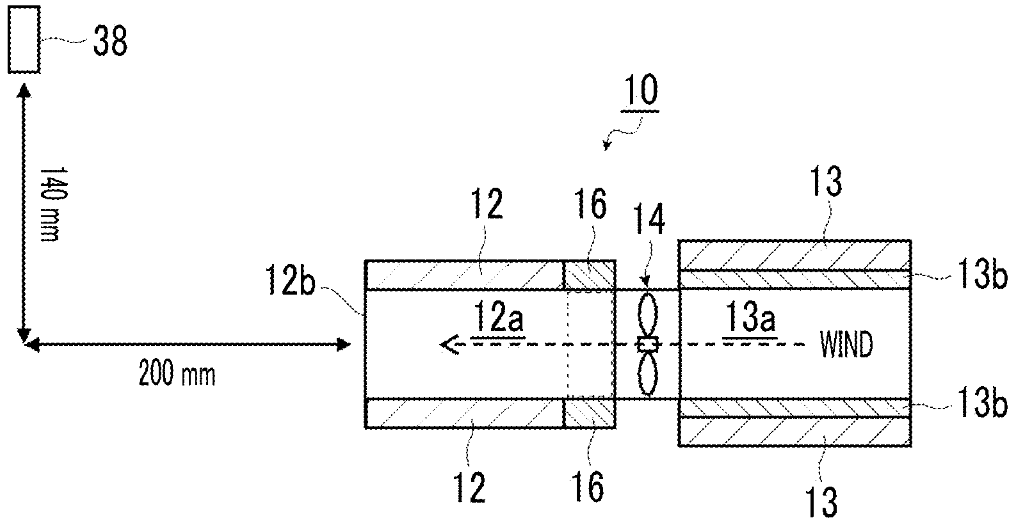
FIG. 36 is a top view of an experimental system that measures noise of an acoustic system used in an example of the present invention.

In a noise measurement system of the acoustic unit 10 shown in FIG. 36, which was configured as described above, as the three membrane-type resonating bodies 16 could be moved downstream from the position of the fan 14, the center position of the membrane-type resonating bodies 16 with respect to the sound source (the fan 14) (a distance between the center position of the blades of the fan 14 and the center position of the membrane-type resonating bodies 16 in a cross section in the duct flow passage direction) was changed, and the sound pressure of noise radiated from the duct of the acoustic unit 10 according to the embodiment of the present invention when the fan 14 was rotated at a rotation speed of 13,800 rpm was measured by the microphone 38.

Figure 39:
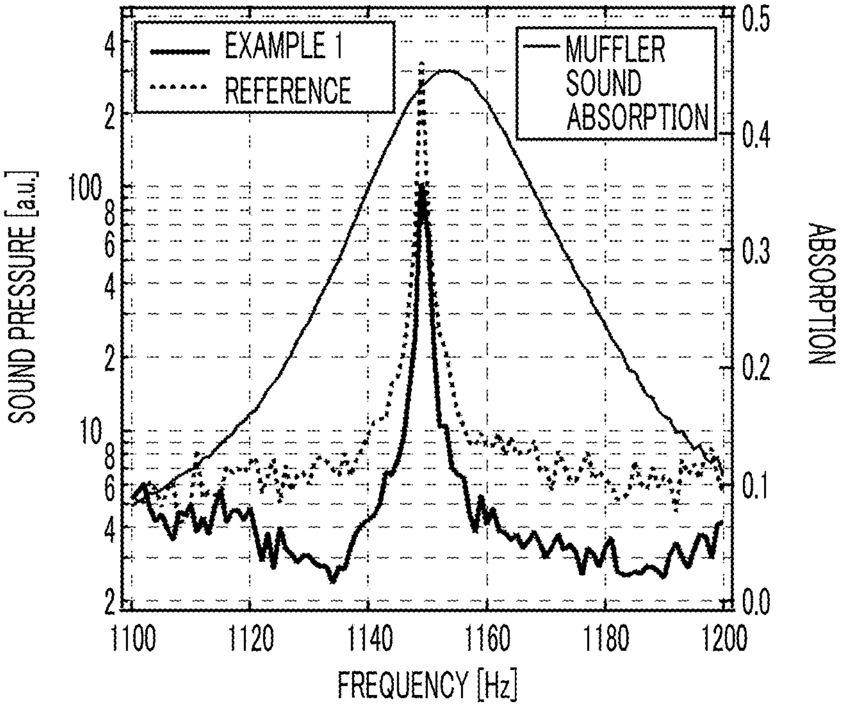
FIG. 39 is a graph showing a measured sound pressure with respect to a frequency of Example 1.

A relationship between the sound pressure measured in this manner and the frequency is shown in FIG. 39 as Example 1 in which the center position of the membrane-type resonating bodies 16 with respect to the fan 14 was λ/2. Herein, a wavelength λ was 296 mm. FIG. 39 shows the sound pressure in a case where the membrane-type resonating body 16 was not disposed as reference. In addition, FIG. 39 also shows sound absorption through muffling by a muffler when the membrane-type resonating bodies 16 functioned as the muffler.

Figure 40:
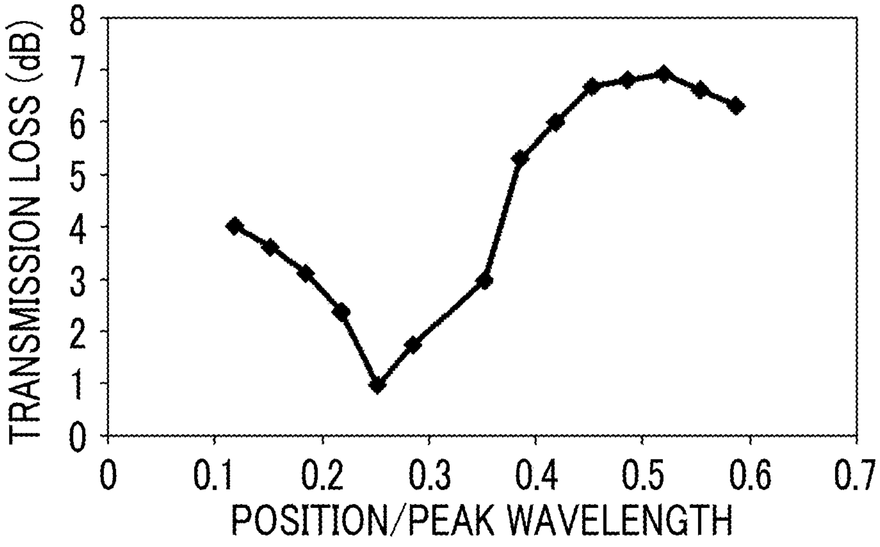
FIG. 40 is a graph showing a transmission loss at 1,150 Hz with respect to a ratio between a position of the membrane-type resonating body and a wavelength.

In addition, FIG. 40 shows a relationship between a center position/λ of the membrane-type resonating body 16 with respect to the fan 14 and a transmission loss at 1,150 Hz. That is, a microphone sound pressure in a case where the membrane-type resonating body 16 is disposed at each position at 1,150 Hz and a reference microphone sound pressure where the membrane-type resonating body is not disposed were compared to each other, and the result was expressed as a transmission loss. Points shown in FIG. 40 are all examples of the present invention.

FIG. 39 shows that a thick solid line of Example 1 had a significantly lower sound pressure than a dotted line of reference, and a larger muffling effect than the reference. That is, it is found out that Example 1, in which the position of the membrane-type resonating body 16 was λ/2, had a large muffling effect.

In addition, from FIG. 40, it is found out that in a case where the position/k was 0.25, that is, the position was λ/4, there were transmission losses at points ahead or behind the position although the transmission losses were small. On the contrary, in a case of Example 1 in which the position/λ was 0.5, that is, the position was λ/2, there were larger transmission losses at points ahead or behind the position.

That is, it was found out that a muffling effect changed depending on a place where the membrane-type resonating body was disposed, and the effect was large particularly at the position of λ/2 from the fan.

Further, from FIG. 40, it is found out that a transmission loss amount increased in a case where the distance to the fan was made closer than λ/4. In a case where the distance was made closest, the position was 0.12λ and the transmission loss exceeded 4 dB. As described above, it became clear that not only the position of 0.52λ but also a direction in which the membrane-type resonating body 16 was brought closer to the fan than 0.25λ are optimum values for increasing the transmission loss. This suggests that the optimum value of the transmission loss was a position m×λ/2 (m was an integer of 0 or more) in a case of being combined with the simulations.

From the above, it is found out that the muffling effect of the membrane-type resonating body 16 had the position dependence of the membrane-type resonating body 16, and bringing the position of the membrane-type resonating body 16 further away from λ/4 and bringing closer to 0 or λ/2 were desirable.

Example 2 and Comparative Example 1

In the same measurement system as in Example 1, the microphone 38 was disposed at a position separated at a right angle by 100 mm from a position 100 mm downstream side instead of the position separated at a right angle by 140 mm from the position 200 mm downstream side.

The amount of current was adjusted such that the predominant sound of the fan 14 was set to 1,500 Hz. At this time, an end portion wind speed measured by a flow meter was 7.8 m/s. With respect to the measurement system, comparison between an acoustic unit 10*a* of Example 2 comprising the membrane-type resonating bodies 16 shown in FIGS. 41A and 41B and an acoustic unit 50 of Comparative Example 1 comprising Helmholtz resonating bodies 52 shown in FIGS. 42A and 42B was made.

Figure 41A:
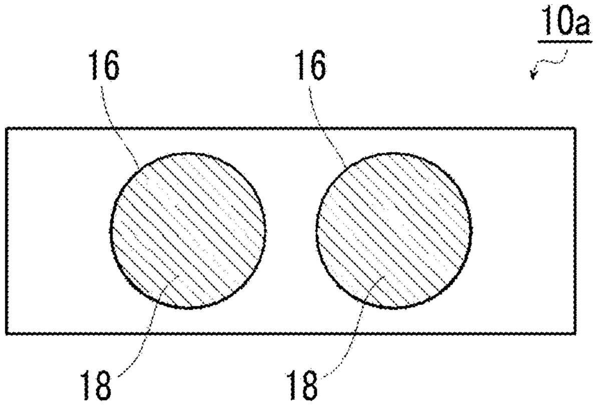
FIG. 41A is a schematic side cross sectional view of an acoustic unit of Example 2.
Figure 41B:
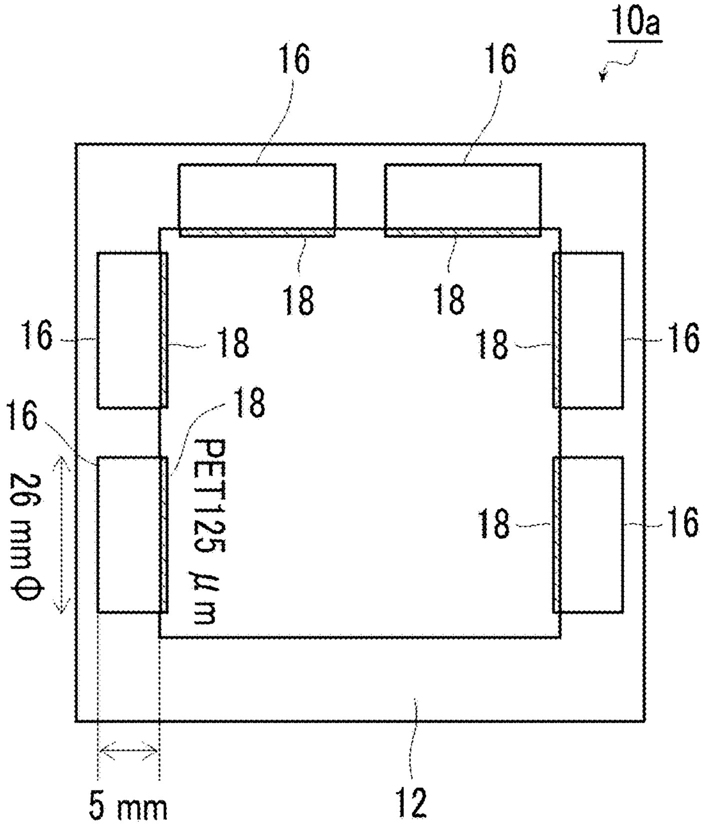
FIG. 41B is a schematic cross sectional view of the acoustic unit of Example 2.
Figure 42A:
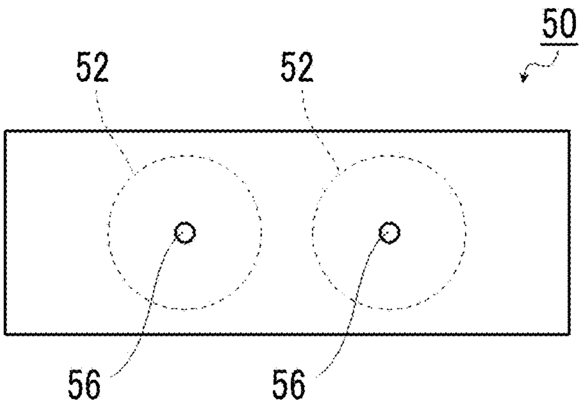
FIG. 42A is a schematic side cross sectional view of an acoustic unit of Comparative Example 1.
Figure 42B:
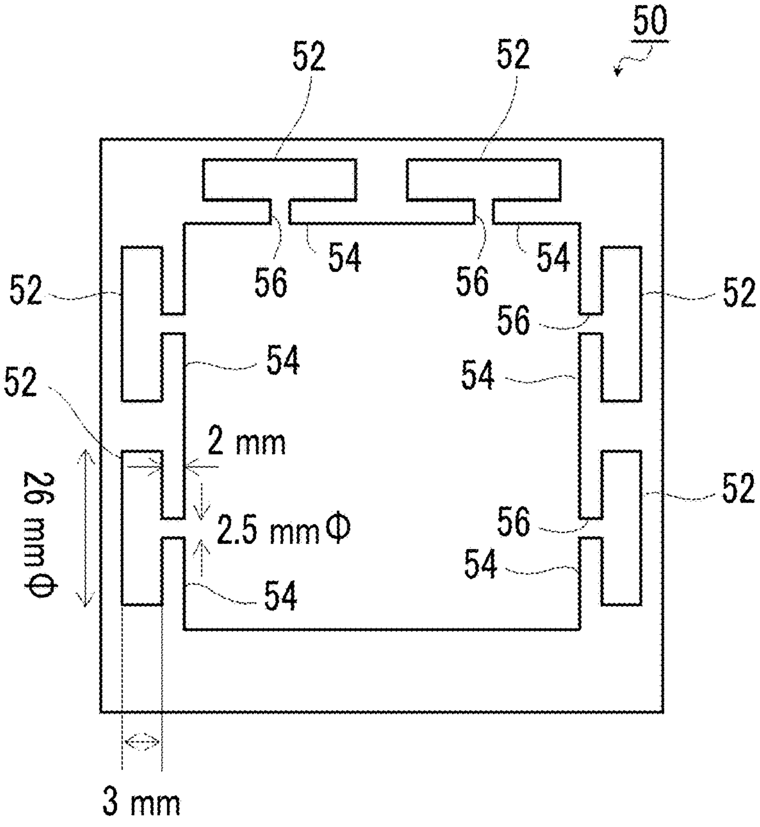
FIG. 42B is a schematic cross sectional view of the acoustic unit of Comparative Example 1.

A structure where six membrane-type resonating bodies (two for each side surface among three side surfaces, in total, six) each having a membrane-type fixing unit having Φ26 mm shown in FIGS. 41A and 41B were disposed on one surface in the cross section of the duct 12 was adopted for the membrane-type resonating bodies 16 of the acoustic unit 10*a* of Example 2. The membrane-shaped member 18 of the membrane-type resonating body 16 was made of polyethylene terephthalate (PET) having a thickness of 125 μm, and the rear surface distance was 5 mm. The resonant frequency of the acoustic unit 10*a* having this structure was 1,500 Hz.

The acoustic unit 50 of Comparative Example 1 was configured as in the acoustic unit 10*a* of Example 2 except for using the Helmholtz resonating bodies 52 to be compared to, instead of the membrane-type resonating bodies 16. That is, the number and disposed positions of the Helmholtz resonating bodies 52 were the same as those of the membrane-type resonating bodies 16 of Example 2. The Helmholtz resonating bodies 52 to be compared to was designed such that each volume thereof was the same as the membrane-type resonating body 16. That is, the thickness of a surface plate 54 was 2 mm, the rear surface distance was 3 mm, the rear surface was a 126 mm cylindrical cavity, and a through hole (resonance hole) 56 that had a hole diameter of 2.5 mm and a thickness of 2 mm was in the surface plate 54. The resonant frequency was also 1,500 Hz. Each frame and a structure such as the surface plate 54 of the Helmholtz resonating body 52 were prepared by processing an acrylic plate with a laser cutter.

The disposed positions of the membrane-type resonating body 16 and the Helmholtz resonating bodies 52 were determined to be positions attached to an exhaust side fan end portion. That is, frame portions of the membrane-type resonating body 16 and the Helmholtz resonating body 52 were disposed at positions in contact with the casing of the fan 14 as in FIG. 36.

In this manner, acoustic measurement was performed in the cases of the acoustic unit 10*a* of Example 2, the acoustic unit 50 of Comparative Example 1, an acoustic unit 60 that does not have a resonating body, such as the membrane-type resonating body 16 and the Helmholtz resonating bodies 52, and only has the duct 12. The results are shown in FIG. 43 and Table 1.

TABLE 1

| | Resonating body | Microphone position sound volume (db) | Transmission loss (db) |
|---|---|---|---|
| Reference example 1 | No resonating body | 57.4 | |
| Example 2 | Membrane-type (1 row) | 47.3 | 10.1 |
| Comparative example 1 | Helmholtz | 53.3 | 4.0 |
| Example 3 | Membrane-type (2 rows) | 44.9 | 12.4 |
| Example 4 | Membrane-type (4 rows) | 41.6 | 15.7 |

Figure 43:
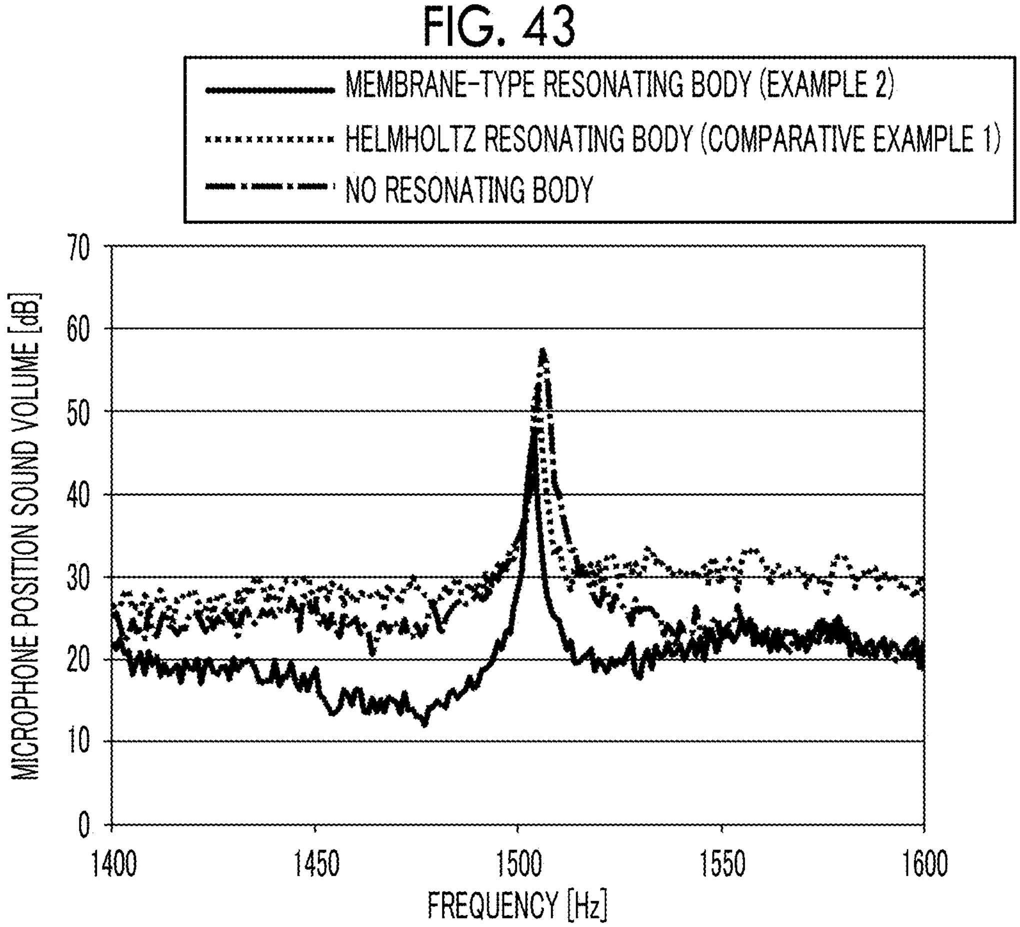
FIG. 43 is a graph showing microphone position sound volume with respect to frequencies of Example 2 and Comparative Example 1.

FIG. 43 shows a microphone position sound pressure near fan peak sound when the resonating body was not disposed (Reference Example 1), the membrane-type resonating body 16 was disposed (Example 2), and the Helmholtz resonating body 52 was disposed (Comparative Example 1).

As shown in Table 1, in a case where a transmission loss was calculated from a sound pressure between peaks, while there was peak muffled sound volume of 10 dB or more in Example 2, there was only peak muffled sound volume of 4 dB in Comparative Example 1. Between the resonating bodies having the same volume, the membrane-type resonating body 16 had a larger peak sound transmission loss than the Helmholtz resonating body 52.

Further, according to FIG. 43, in the membrane-type resonating body 16, sound other than peak sound was also decreased around the low frequency side, and sound was not increased compared to when there is basically no resonating body.

On the other hand, in Comparative Example 1 in which the Helmholtz resonating body 52 was disposed, sound volume was more increased in the entire band shown, in particular, on high frequency side than when there was no resonating body. This difference reached approximately 10 dB at the maximum. An increase in sound volume by the Helmholtz resonating body 52 was caused by wind noise brought about by the Helmholtz resonating body 52. That is, as wind flowed along with sound in the duct, wind noise was generated at an opening portion of the Helmholtz resonating body 52. More specifically, a fluid vortex was generated at an opening portion edge portion, causing a wind noise component to appear. Although the wind noise component itself was like white noise of which a frequency characteristic was not distinctive, the generated wind noise component interacted with the Helmholtz resonating body 52. In this case, the wind noise component was trapped in the resonating body and was enhanced near the resonant frequency of Helmholtz resonance. As the enhanced component was again radiated from the Helmholtz resonating body through the opening portion, causing a strong wind noise source which had a characteristic frequency. Due to this effect, the sound volume was increased near the Helmholtz resonant frequency (this is exactly the same phenomenon which occurred when a PET bottle was blown).

That is, in a case where a resonant frequency was adjusted to fan peak noise in an attempt to muffle fan noise using the Helmholtz resonating body, wind noise was inevitably increased at the resonant frequency and some of a muffling effect was eliminated. Further, since Helmholtz resonance generally had a wider frequency width than fan peak sound, large wind noise at a frequency around the fan peak sound resulted in an increase in noise volume.

On the other hand, the membrane-type resonating body did not generate wind noise including a frequency around peak sound as well. Accordingly, without increasing sound volume, a large muffling effect could be obtained at the peak sound frequency. Accordingly, it was found out that the membrane-type resonating body that does not have the opening portion is more suitable to muffling than the resonance structure that has the opening portion, such as Helmholtz resonance.

Examples 3 and 4

Figure 44:
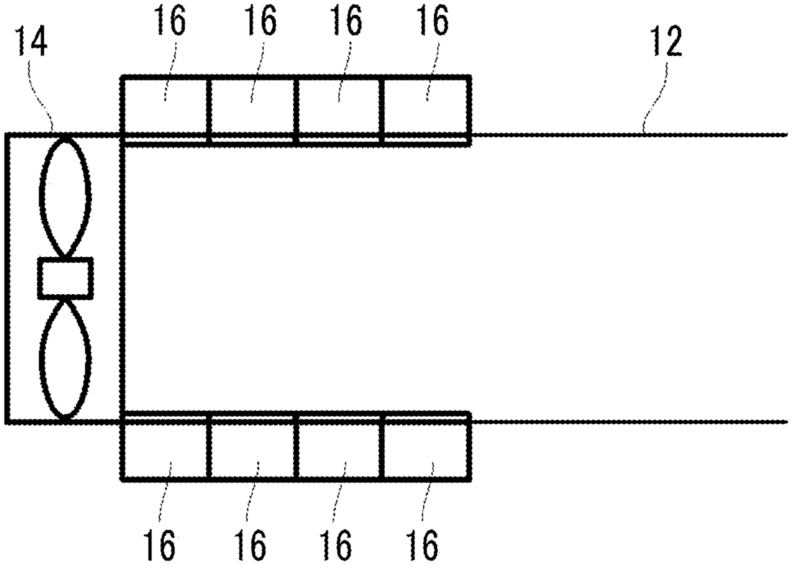
FIG. 44 is a schematic top view of an acoustic unit of Example 4.
Figure 45:
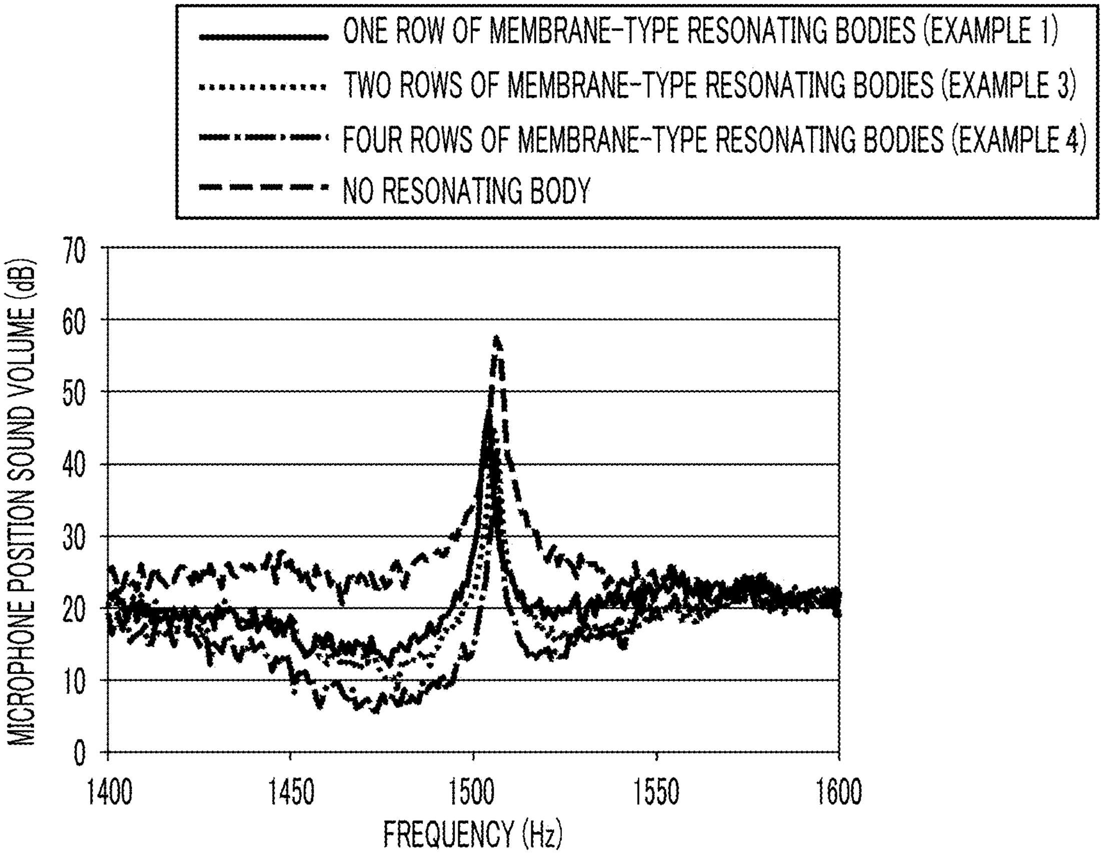
FIG. 45 is a graph showing microphone position sound volume with respect to frequencies of Examples 1 to 3.

In a measurement system which was the same as in Example 2, an experiment of obtaining a larger muffling effect was performed by disposing the membrane-type resonating bodies 16 in the duct flow passage direction in two rows (Example 3) and four rows (Example 4) instead of one row. FIG. 44 shows an image diagram in a case of four-row disposition. FIG. 45 shows the results.

FIG. 45 shows a microphone position sound volume spectrum measured under each disposition condition of the membrane-type resonating bodies 16. In addition, Table 1 shows comparison of peak sound volume including the results of Example 2. It was found out that a larger muffling effect was obtained by disposing the membrane-type resonating bodies 16 in a plurality of rows in the duct flow passage direction. In a case of being arranged in four rows, a muffling effect of 15 dB or more could be obtained.

In addition, after a flow meter measured a wind speed in each of Example 2, Example 3, and Example 4, it was found out that the speeds of all of the examples were 7.8 m/s. This was the wind speed which was the same in a case where the membrane-type resonating body 16 was not disposed. It was found out that air volume was not impaired by disposing the membrane-type resonating bodies 16 on the wall surface.

Through the results, the effects of the present invention were made clear.

Although various embodiments and examples of the acoustic system according to the embodiment of the present invention have been described in detail hereinbefore, the present invention is not limited to the embodiments and examples, and it is evident that various improvements or changes may be made without departing from the gist of the present invention.

EXPLANATION OF REFERENCES

10, 10*a*, 50, 60: acoustic system
12, 13: duct
12*a*, 13*a*: through-hole
12*b*, 12*c*, 20*c*: open end
12*d*: wall
12*e*: opening
12*f*: closed end portion
13*b*: urethane rubber
14: fan
16: membrane-type resonating body (membrane-type resonance structure)
18: membrane-shaped member (membrane)
20: frame
20*a*: rear surface closed space
20*b*: opening portion
22: propeller fan
24: casing
26: hub
28: propeller
30: fan main body
32: weight
34: sound source (internal sound source)
36: reflection wall
38: microphone
52: Helmholtz resonating body
54: surface plate
56: through hole (resonance hole)

What is claimed is:

1. An acoustic system comprising:
a duct that has a function of causing a fluid to flow therein and has a tubular shape;
an internal sound source that is disposed inside the duct or at an outer peripheral portion of the duct, which communicates with an inside of the duct, or an external sound source that is on an outside from an end portion of the duct; and
a membrane-shaped member that is formed as a part of a wall of the duct and vibrates in response to sound,
wherein a structure including the membrane-shaped member and a rear surface thereof causes acoustic resonance to occur, transmits the acoustic resonance from the sound source into the duct, and suppresses sound radiated from the other end portion of the duct,
the external sound source is at a distance within a wavelength at a frequency of the acoustic resonance on the outside from the end portion of the duct, and
for at least one membrane-shaped member or at least one membrane-type resonance structure, in a case where a wavelength determined from a frequency at which a sound pressure of sound generated by the sound source is maximum is denoted by λ and an integer of 0 or more is denoted by m, a center of the membrane-shaped member is positioned at a distance which is larger than (m×λ/2−λ/4) and is smaller than (m×λ/2+λ/4) from a position of the sound source.

2. The acoustic system according to claim 1,
wherein the fluid is a gas, and flows in the duct as at least one of wind or an air flow including heat, and
in the duct, a direction in which the fluid flows and a membrane surface of the membrane-shaped member are not perpendicular to each other.

3. The acoustic system according to claim 1,
wherein the sound source is a sound source that generates predominant sound of which a sound pressure at at least one specific frequency is maximum.

4. The acoustic system according to claim 3,
wherein the sound source is a fan, and
the predominant sound is sound, which is generated by a blade forming the fan and a rotation speed and is emitted from the fan to an outside.

5. The acoustic system according to claim 1,
wherein the membrane-shaped member is attached to an opening provided in a part of the wall of the duct.

6. The acoustic system according to claim 5,
wherein an edge portion of the membrane-shaped member is a fixed end.

7. The acoustic system according to claim 1,
wherein the membrane-shaped member is formed to vibrate by making a part of the wall of the duct thin.

8. The acoustic system according to claim 1,
wherein a rear surface space of the membrane-shaped member is formed by a substantially closed space, and
the structure including the membrane-shaped member and the rear surface is a membrane-type resonance structure in which a resonant frequency is determined by the membrane-shaped member and the rear surface space.

9. The acoustic system according to claim 8,
wherein the membrane-type resonance structure is a structure in which a sound absorption coefficient of higher-order vibration is higher than a sound absorption coefficient of fundamental vibration.

10. The acoustic system according to claim 8,
wherein in a case where a Young's modulus of the membrane-shaped member is denoted by E (Pa), a thickness is denoted by t (m), a thickness of the rear surface space is denoted by d (m), and a circle equivalent diameter of a region where the membrane-shaped member vibrates is denoted by Φ (m), hardness $E\times t^3$ ($Pa\times m^3$) of the membrane-shaped member is $21.6\times d^{-1.25}\times\Phi^{4.15}$ or less.

11. The acoustic system according to claim 1,
wherein the membrane-shaped members are disposed in a plurality of rows in a flow passage direction of the duct.

12. The acoustic system according to claim 1,
wherein the membrane-shaped member has a mass distribution.

13. The acoustic system according to claim 1,
wherein a weight is attached to the membrane-shaped member.

14. The acoustic system according to claim 13,
wherein the weight is attached to the rear surface of the membrane-shaped member.

15. The acoustic system according to claim 1,
wherein for at least one membrane-shaped member or at least one membrane-type resonance structure, in a case where a wavelength determined from a frequency at which a sound pressure of sound generated by the sound source is maximum is denoted by λ, a center of the membrane-shaped member is positioned at a distance which is less than λ/4 from a position of the sound source.

16. The acoustic system according to claim 1,
wherein the duct is a case that surrounds at least a part of the sound source.

17. The acoustic system according to claim 1,
wherein the sound source is a fan,
the duct is a fan casing that surrounds the fan, and
the membrane-shaped member is attached to the fan casing.

18. The acoustic system according to claim 1,
wherein as there are a high impedance interface that is a reflection interface, which reflects, at a frequency at which a sound pressure of sound generated by the sound source is maximum, at least some of the sound with a surface where an impedance change occurs on a high impedance side from the sound source in the duct, the sound source, and the membrane-shaped member, externally radiating sound emitted from the duct is suppressed.

19. The acoustic system according to claim 18,
wherein for at least one membrane-shaped member or at least one membrane-type resonance structure, in a case where a wavelength determined from the frequency at which the sound pressure of the sound generated by the sound source is maximum is denoted by λ and an integer of 0 or more is denoted by m, a center of the membrane-shaped member is positioned at a distance which is larger than m×λ/2−λ/4 and is smaller than m×λ/2+λ/4 from the reflection interface that causes the acoustic impedance change.

20. The acoustic system according to claim 19,
wherein for at least one membrane-shaped member or at least one membrane-type resonance structure, in a case where the wavelength determined from the frequency at which the sound pressure of the sound generated by the sound source is maximum is denoted by λ, the center of the membrane-shaped member is positioned at a position within ±λ/4 from the high impedance interface.

21. The acoustic system according to claim 18,
wherein a reflection portion including the reflection interface, the sound source, and the membrane-shaped member are disposed at a distance within λ/2, and suppress radiating sound toward an opposite side to the reflection portion.

22. An acoustic system comprising:
a duct that has a function of causing a fluid to flow therein and has a tubular shape;
an internal sound source that is disposed inside the duct or at an outer peripheral portion of the duct, which communicates with an inside of the duct, or an external sound source that is on an outside from an end portion of the duct; and
a membrane-shaped member that is formed as a part of a wall of the duct and vibrates in response to sound,
wherein a structure including the membrane-shaped member and a rear surface thereof causes acoustic resonance to occur, transmits the acoustic resonance from the sound source into the duct, and suppresses sound radiated from the other end portion of the duct,
the external sound source is at a distance within a wavelength at a frequency of the acoustic resonance on the outside from the end portion of the duct,
a rear surface space of the membrane-shaped member is formed by a substantially closed space,
the structure including the membrane-shaped member and the rear surface is a membrane-type resonance structure in which a resonant frequency is determined by the membrane-shaped member and the rear surface space, and
in a case where a Young's modulus of the membrane-shaped member is denoted by E (Pa), a thickness is denoted by t (m), a thickness of the rear surface space is denoted by d (m), and a circle equivalent diameter of a region where the membrane-shaped member vibrates is denoted by Φ (m), hardness $E\times t^3$ ($Pa\times m^3$) of the membrane-shaped member is $21.6\times d^{-1.25}\times\Phi^{4.15}$ or less.

23. An acoustic system comprising:
a duct that has a function of causing a fluid to flow therein and has a tubular shape;
an internal sound source that is disposed inside the duct or at an outer peripheral portion of the duct, which communicates with an inside of the duct, or an external sound source that is on an outside from an end portion of the duct; and
a membrane-shaped member that is formed as a part of a wall of the duct and vibrates in response to sound,
wherein a structure including the membrane-shaped member and a rear surface thereof causes acoustic resonance to occur, transmits the acoustic resonance from the sound source into the duct, and suppresses sound radiated from the other end portion of the duct,
the external sound source is at a distance within a wavelength at a frequency of the acoustic resonance on the outside from the end portion of the duct,
as there are a high impedance interface that is a reflection interface, which reflects, at a frequency at which a sound pressure of sound generated by the sound source is maximum, at least some of the sound with a surface where an impedance change occurs on a high impedance side from the sound source in the duct, the sound source, and the membrane-shaped member, externally radiating sound emitted from the duct is suppressed, and
for at least one membrane-shaped member or at least one membrane-type resonance structure, in a case where a wavelength determined from the frequency at which the sound pressure of the sound generated by the sound source is maximum is denoted by λ and an integer of 0 or more is denoted by m, a center of the membrane-shaped member is positioned at a distance which is larger than m×λ/2−λ/4 and is smaller than m×λ/2+λ/4 from the reflection interface that causes the acoustic impedance change.

* * * * *